(12) United States Patent
Yamaguchi et al.

(10) Patent No.: US 7,014,954 B2
(45) Date of Patent: Mar. 21, 2006

(54) NONAQUEOUS ELECTROLYTE SECONDARY BATTERY INCLUDING VINYLENE CARBONATE AND AN ANTIOXIDANT IN THE ELECTROLYTE

(75) Inventors: Akira Yamaguchi, Fukushima (JP); Atsuo Omaru, Fukushima (JP); Masayuki Nagamine, Fukushima (JP); Minoru Hasegawa, Fukushima (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 09/866,035

(22) Filed: May 25, 2001

(65) Prior Publication Data

US 2002/0037458 A1    Mar. 28, 2002

(30) Foreign Application Priority Data

May 26, 2000  (JP)  ............................ P2000-157116
Jun. 30, 2000  (JP)  ............................ P2000-200368

(51) Int. Cl.
  *H01M 10/08*    (2006.01)
(52) U.S. Cl. ........................ 429/330; 429/324; 429/347
(58) Field of Classification Search ................ 429/224, 429/231.1, 231.3, 300, 303, 330
  See application file for complete search history.

(56) References Cited

U.S. PATENT DOCUMENTS

| 5,169,736 A | 12/1992 | Bittihn et al. ............... 429/194 |
| 5,677,083 A | 10/1997 | Tomiyama ................... 429/194 |
| 5,709,968 A * | 1/1998 | Shimizu ...................... 429/324 |
| 5,712,059 A | 1/1998 | Barker et al. ............... 429/197 |
| 5,783,333 A * | 7/1998 | Mayer ......................... 429/223 |
| 5,882,821 A | 3/1999 | Miyasaka ................... 429/224 |

FOREIGN PATENT DOCUMENTS

| EP | 0997960 | 10/1999 |
| EP | 0851524 | 6/2000 |
| EP | 1089371 | 4/2001 |
| EP | 1113515 | 7/2001 |
| JP | 07192759 | 7/1995 |
| JP | 07302614 | 11/1995 |
| JP | 10247517 | 9/1998 |
| JP | 10308236 A  * | 11/1998 |
| JP | 11040194 | 2/1999 |
| JP | 11067266 | 3/1999 |
| JP | 11073991 | 3/1999 |
| JP | 11121032 | 4/1999 |
| JP | 11260401 | 9/1999 |
| JP | 11273726 | 10/1999 |
| JP | 11283667 | 10/1999 |
| JP | 11339851 | 12/1999 |
| JP | 2000021442 | 1/2000 |
| JP | 2000021444 | 1/2000 |
| JP | 2000058125 | 2/2000 |
| JP | 2000106210 | 4/2000 |
| JP | 2000123867 | 4/2000 |
| JP | 2001283906 | 10/2001 |
| WO | WO 01/84659 | 11/2001 |

* cited by examiner

*Primary Examiner*—Mark Ruthkosky
(74) *Attorney, Agent, or Firm*—Sonnenschein, Nath & Rosenthal LLP

(57) ABSTRACT

A nonaqueous electrolyte secondary battery comprises a cathode having a cathode active material capable of electrochemically doping/dedoping lithium, an anode having an anode active material capable of electrochemically doping/dedoping lithium and a nonaqueous electrolyte interposed between the cathode and the anode. The nonaqueous electrolyte includes at least one or more kinds of vinylene carbonate, methoxybenzene compounds or antioxidants. The nonaqueous electrolyte secondary battery has a good cyclic characteristic under any environment of low temperature, ambient temperature and high temperature.

24 Claims, 9 Drawing Sheets

NONAQUEOUS ELECTROLYTE SECONDARY BATTERY INCLUDING VINYLENE CARBONATE AND AN ANTIOXIDANT IN THE ELECTROLYTE

RELATED APPLICATION DATA

The present and foregoing application claim priority to Japanese Application No. P2000-157116 filed May 26, 2000 and Japanese Patent Application No. P2000-200368 filed Jun. 30, 2000. All of the foregoing applications are incorporated herein by reference to the extent permitted by law.

BACKGROUND OF THE INVENTION

1. Field of the Invention

The present invention relates to a nonaqueous electrolyte battery comprising a cathode, an anode and a nonaqueous electrolyte. More particularly, the present invention relates to a nonaqueous electrolyte battery having a good cyclic characteristic under any environment of low temperature, ambient temperature and high temperature.

2. Description of Prior Art

Lately, there have been developed and supplied various kinds of portable electronic devices such as a video camera with video tape recorder, portable telephones, lap top computers, or the like and it has been necessary to decrease the sizes and weight thereof. Then, a study and development for improving the energy densities of a portable power supplies of these electronic devices such as batteries, especially, secondary batteries have been advanced. Since a lithium-ion secondary battery among them can achieve energy density larger than those of a lead battery and nickel cadmium battery which are conventional aqueous electrolyte batteries, it has been greatly anticipated.

As cathode active materials used for the lithium-ion battery, lithium-cobalt composite oxides, lithium-manganese composite oxides, and lithium-nickel composite oxides have been put to practical use. While they have respectively advantages and disadvantages, the lithium-cobalt composite oxides have a most desirable balance from the viewpoints of capacity, cost and thermal stability, so that they are widely employed. Although the lithium-manganese composite oxides are low in their capacities and bad in their high temperature cyclic characteristics, they are more excellent than the lithium-cobalt composite oxides in view of costs and stability in supply of raw materials, and accordingly, they have been greatly anticipated and the study of them has been advanced.

As the configurations of the lithium-ion secondary batteries, there may be exemplified a cylindrical battery in which a spirally coiled electrode element is inserted into a cylindrical case and a rectangular battery in which a folded electrode or a rectangular laminated electrode element or a coiled electrode element formed by winding long bond shape cathodes and anodes is inserted into a rectangular case. The rectangular battery as the latter is higher in its space efficiency than that of the cylindrical battery. Thus, a demand for the rectangular battery has been recently increased, since the thickness of the portable electronic devices has been lately decreased.

Since the above described compact secondary battery is used not only in an ordinary state, but also in a vehicle in the mid-summer day, high reliability is required for the secondary battery. Particularly, since the strength of a rectangular battery can is lower than that of a cylindrical battery can, it is apt to be deformed due to the increase of internal pressure of the battery. Therefore, in using case of a rectangular battery which is accommodated in the electronic device, when the battery is exposed to high temperature, the battery may possibly expand due to the decomposition of the electrolyte solution in the battery, which will cause the breakage of the battery or the damage of the device.

However, in the information terminal of a note book type personal computer on which a high performance CPU is mounted, the rise of temperature due to the heat generated from the CPU recently gives an adverse influence to the battery. Therefore, although a fan for releasing the heat is installed in the vicinity of the CPU, it cannot be said that only this countermeasure completely prevents the adverse influence. Further, since it is expected that a higher performance CPU is adopted in the future, a worse influence may be possibly applied to the battery. In the nonaqueous secondary battery using the lithium-manganese composite oxides, the characteristic thereof is similar to that of the lithium-cobalt composite oxides or the lithium-nickel composite oxides at ambient temperature, however, a cyclic characteristic is incomplete at high temperature, because an insufficient battery property is obtained at high temperature (45° C. to 60° C.) resulting from a spinel lithium-manganese oxide. Especially, since the CPU operates and charging and discharging cycles are frequently repeated at about 45° C. in the note book type personal computer, the lithium-manganese composite oxides cannot be used, unless the battery properties at the high temperature (45° C. to 60° C.) resulting from the spinel lithium-manganese oxide are improved. Further, since the above described secondary battery is employed not only for the note book type personal computer, but also for other portable electronic devices, the cyclic characteristics at low temperature and ambient temperature are equally important.

SUMMARY OF THE INVENTION

The present invention was proposed with the above described circumstances into consideration and it is an object of the present invention to provide a nonaqueous electrolyte battery having a good cyclic characteristic under any environment of low temperature, ambient temperature and high temperature.

Further, it is another object of the present invention to provide a nonaqueous electrolyte battery excellent characteristic in its storage property under high temperature and in its reliability and high energy density by suppressing the decomposition of electrolyte solution in a rectangular battery even when the battery is exposed to the high temperature.

A nonaqueous electrolyte battery according to the present invention comprises a cathode, an anode and nonaqueous electrolyte with which a sealed battery can is filled. The nonaqueous electrolyte includes unsaturated cyclic carbonate and/or halogenated methoxybenzene compounds.

The cathode has a cathode active material capable of being electrochemically doped/dedoped with lithium.

As the cathode active material, for instance, lithium composite oxides expressed by a general formula $Li_xMO_2$ or intercalation compounds including Li can be used. In this case, M indicates one or more kinds of transition metals and x is ordinarily a value located within a range from 0.05 or more to 1.10 or lower.

As the transition metals M for constituting the lithium composite oxides, at least one kind of cobalt (Co), nickel (Ni), or manganese (Mn) is preferably used. As the specific examples of the lithium composite oxides, there may be exemplified $LiCoO_2$, $LiNiO_2$, $Li_xNi_yCo_{1-y}O_2$ (the values of x and y are different depending on the charging and discharging states of the battery. Generally, the value of x is expressed by the relation 0<x<1, and the value of y is expressed by the relation 0.7<y<1.0) or $LiMn_2O_4$, or the like.

Further, in addition to the lithium composite oxides, the second lithium-containing compounds may be added to the above described lithium composite oxides and the obtained product may be used as the cathode active material. As the second lithium-containing compounds, for example, $LiMn_{2-y}M_yO_4$ and $LiMoS_2$, $LiTiS_2$, $LiP_2O_5$, $Li_xFePO_4$, or the like may be enumerated.

Each of these cathode active materials preferably has an average particle size ranging from 3 μm or more to 7 μm or lower.

According to another aspect of the present invention, there is provided a nonaqueous electrolyte secondary battery comprising a cathode having a cathode active material capable of being electrochemically doped/dedoped with lithium; an anode having an anode active material capable of being electrochemically doped/dedoped with lithium and a nonaqueous electrolyte interposed between the cathode and the anode, wherein the cathode active material includes a lithium-manganese composite oxide expressed by a general formula $Li_xMn_{2-y}M'_yO_4$ (here, x satisfies the relation expressed by x≧0.9, y satisfies the relation expressed by 0.5≧y≧0.01. M' indicates at least one or more elements selected from between Fe, Co, Ni, Cu, Zn, Al, Sn, Cr, V, Ti, Mg, Ca and Sr) and the nonaqueous electrolyte includes at least one or more kinds of vinylene carbonate, methoxybenzene compounds or antioxidants.

As mentioned above, since at least one or more of vinylene carbonate, methoxybenzene compounds or antioxidants effective for improving the cyclic characteristic in each temperature range are contained in the nonaqueous electrolyte, the cyclic characteristic is more improved in a wider temperature range in the nonaqueous electrolyte battery according to the present invention.

According to a further aspect of the present invention, there is provided a nonaqueous electrolyte secondary battery comprising a cathode having a cathode active material capable of being electrochemically doped/dedoped with lithium; an anode having an anode active material capable of being electrochemically doped/dedoped with lithium and a nonaqueous electrolyte interposed between the cathode and the anode, wherein the cathode active material includes a lithium-manganese composite oxide expressed by a general formula $Li_xMn_{2-y}M'_yO_4$ (here, x satisfies the relation expressed by x≧0.9 and y satisfies the relation expressed by 0.5≧y≧0.01. Further, M' indicates at least one or more elements selected from between Fe, Co, Ni, Cu, Zn, Al, Sn, Cr, V, Ti, Mg, Ca, Sr) and a lithium composite oxide expressed by a general formula $LiM''_zO_2$ (here, z satisfies the relation expressed by 1≧z≧0.5 and M'' indicates at least one or more elements selected from between Fe, Co, Mn, Cu, Zn, Al, Sn, B, Ga, Cr, V, Ti, Mg, Ca, Sr) and the nonaqueous electrolyte includes at least one or more kinds of vinylene carbonate, methoxybenzene compounds or antioxidants.

As described above, since one or more kinds of materials of the vinylene carbonate, methoxybenzene compounds, or antioxidants effective for enhancing the cyclic characteristic in wide temperature range are contained in the nonaqueous electrolyte, therefore the cyclic characteristic is more improved in a wider temperature range in the nonaqueous electrolyte battery according to the present invention.

BRIEF DESCRIPTION OF THE DRAWINGS

The object and other objects and advantages of the present invention will appear more clearly from the following specification in conjunction with the accompanying drawings in which.

DETAILED DESCRIPTION OF THE PREFERRED EMBODIMENT

Now, an embodiment of the present invention will be described below.

Figure 1:
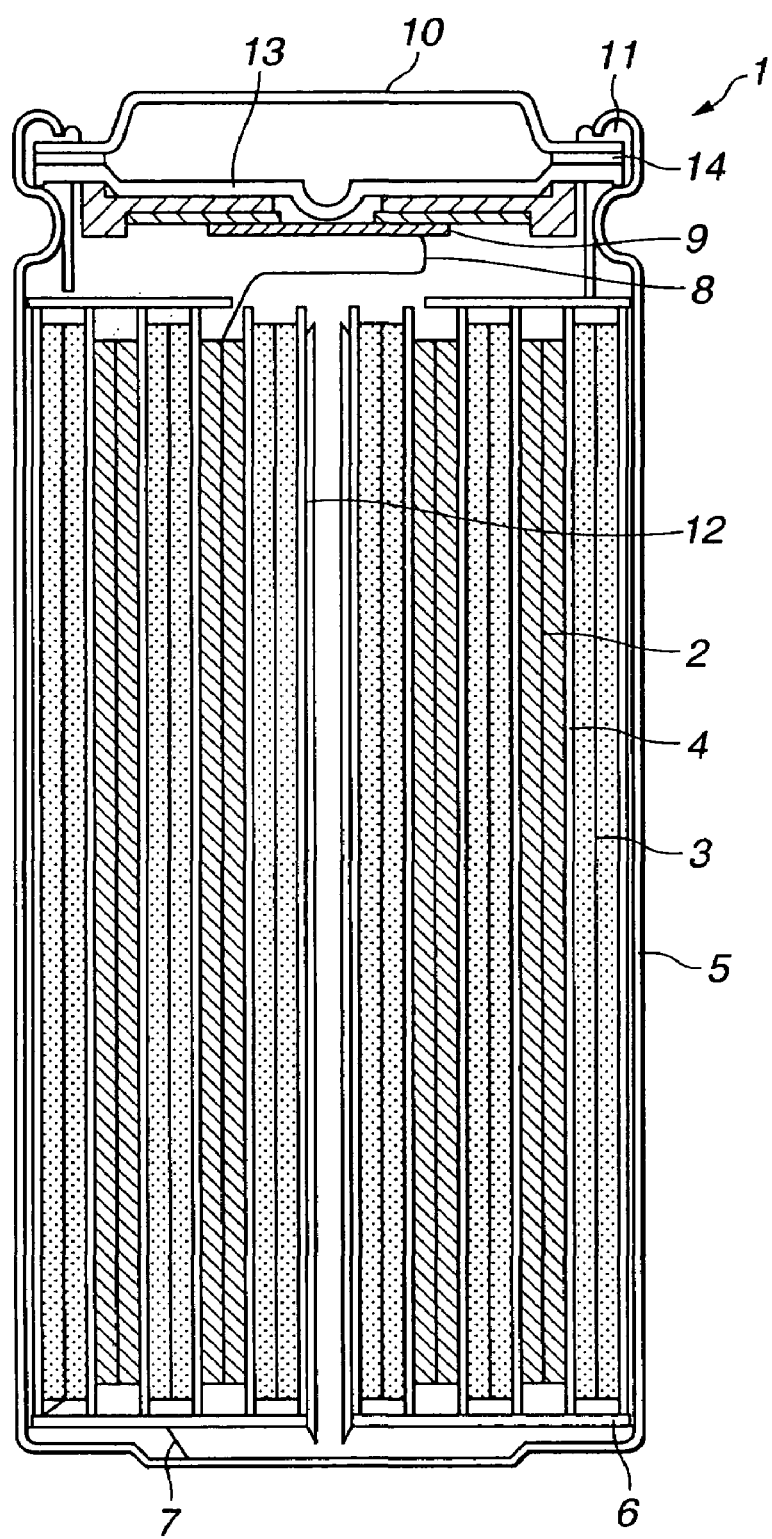
FIG. 1 is a sectional view showing one structural example of a nonaqueous electrolyte battery according to the present invention.

FIG. 1 is a longitudinally sectional view showing one structural example of a nonaqueous electrolyte battery according to the present invention. This nonaqueous electrolyte battery 1 comprises a film type cathode 2, a film type anode 3 and a separator 4. The cathode 2 and the anode 3 are laminated through the separator 4 and the laminated body is tightly coiled to obtain a spirally coiled electrode body. Thus, the spirally coiled electrode body is inserted into a battery can 5.

The cathode 2 is manufactured by applying a cathode compound mixture including a cathode active material and a binding agent to a current collector and drying the cathode compound mixture. For the current collector, for instance, a metal foil such as an aluminum foil is employed.

As the cathode active material, for instance, lithium composite oxides expressed by a general formula $Li_xMO_2$ or intercalation compounds including Li can be used. In this case, M indicates one or more kinds of transition metals and x is ordinarily a value located within a range from 0.05 or more to 1.10 or lower.

As the transition metals M for constituting the lithium composite oxides, at least one kind of material of cobalt (Co), nickel (Ni), or manganese (Mn) is preferably used. As the specific examples of the lithium composite oxides, there may be exemplified $LiCoO_2$, $LiNiO_2$, $Li_xNi_yCo_{1-y}O_2$ (the values of x and y are different depending on the charging and discharging states of the battery. Generally, the value of x is expressed by the relation 0<x<1, and the value of y is expressed by the relation 0.7<y<1.0) or $LiMn_2O_4$, or the like.

Further, in addition to the lithium composite oxides, the second lithium-containing compounds may be added to the above described lithium composite oxides and the obtained product may be used as the cathode active material. As the second lithium-containing compounds, for example, $LiMoS_2$, $LiTiS_2$, $LiP_2O_5$, $Li_xFePO_4$, or the like may be enumerated.

As the cathode active material employed in the present invention, is used a lithium-manganese composite oxide expressed by a general formula $Li_xMn_{2-y}M'_yO_4$ (here, x satisfies the relation expressed by $x \geq 0.9$, y satisfies the relation expressed by $0.5 \geq y \geq 0.01$. M' indicates at least one or more elements selected from between Fe, Co, Ni, Cu, Zn, Al, Sn, Cr, V, Ti, Mg, Ca and Sr).

In the nonaqueous electrolyte battery according to the embodiment of the present invention, a lithium composite oxide expressed by a general formula $LiM''_zO_2$ (here, z satisfies the relation expressed by $1 \geq z \geq 0.5$ and M'' indicates at least one or more elements selected from between Fe, Co, Mn, Cu, Zn, Al, Sn, B, Ga, Cr, V, Ti, Mg, Ca, Sr) may be included in addition to the lithium-manganese composite oxide. It is to be understood that the content ratio the lithium-manganese composite oxide to the lithium composite oxide is not specifically limited.

Further, in respect of the particle size of the cathode active material, the average particle size of both the lithium-manganese composite oxide and the lithium composite oxide is desirably 30 μm or smaller.

The above described lithium-manganese composite oxide or the lithium composite oxide is obtained by mixing carbonates of, for instance, lithium, nickel, manganese, or the like in accordance with its composition and sintering the mixture within the range of temperature of 600° C. to 1000° C. under an atmosphere in which oxygen exists. A starting material is not limited to carbonates and the above described composite oxide may be similarly synthesized from hydroxides, oxides, nitrates, organic acid salts, or the like.

Further, as the binding agent of the cathode compound mixture, a well-known binding agent ordinarily used for the cathode compound mixture of such kind of battery can be used, and further, a well-known additive agent such as a conductive agent may be added to the cathode compound mixture.

The anode 3 is manufactured by applying an anode compound mixture including an anode active material and a binding agent on a current collector and drying the anode compound mixture. A metal foil such as a copper foil is employed for the current collector.

As the anode active material, a material capable of being electrochemically doped/dedoped with lithium under a potential of 2.0 V or lower relative to the lithium metal may be utilized. As materials which can be doped/dedoped with lithium, may be used carbon materials, for instance, non-graphitizable carbon materials, graphite materials, or the like. More specifically, there may be used such carbon materials as natural graphites, pyrocarbons, cokes, graphites, vitreous carbon fibers, organic polymer compound sintered body, carbon fibers, activated carbons, carbon black, or the like. The cokes include pitch cokes, needle cokes, petroleum cokes or the like. Further, the organic polymer compound sintered body indicates a material obtained by sintering and carbonizing a phenol resin or furan resin at suitable temperature.

Metals capable of forming alloys together with lithium or alloys thereof are also used as the anode active material as well as the above described carbon materials. Specifically, there may be exemplified oxides or nitrates doped/dedoped with lithium under a relatively low potential such as iron oxide, ruthenium oxide, molybdenum oxide, tungstic oxide, titanium oxide, tin oxide, or the like.

Further, as the binding agent of the anode compound mixture, a well-known binding agent ordinarily used for such kind of battery can be used. Besides, a well-known additive agent may be added to the anode compound mixture.

The separator 4 is interposed between the cathode 2 and the anode 3 to prevent a short-circuit due to the physical contact of the cathode 2 and the anode 3. As the separator 4, a microporous polyolefine film such as a polyethylene film, a polypropylene film or the like is employed.

Nonaqueous electrolyte solution is prepared by dissolving an electrolyte in a nonaqueous solvent.

As the electrolyte, well-known electrolytes can be used in the electrolyte solution ordinarily employed for such kind of battery. Specifically, there may be enumerated lithium salts such as LiCl, LiBr, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$ or the like. Especially, $LiPF_6$ and $LiBF_4$ are desirable among them in view of stability in oxidation.

The above described electrolyte is preferably dissolved in the nonaqueous solvent so as to have a concentration ranging from 0.1 mol/l to 3.0 mol/l. A more preferable concentration is located within a range of 0.5 mol/l to 2.0 mol/l.

Further, as the nonaqueous solvents, various kinds of nonaqueous solvents which have been hitherto employed for the nonaqueous electrolyte solution can be employed. For instance, there may be exemplified propylene carbonate, ethylene carbonate, diethyl carbonate, dimethyl carbonate, ethylmethyl carbonate, 1,2-dimethoxyethane, 1,2-diethoxyethane, γ-butyrolactone, tetrahydrofuran, 2-methyl tetrahydrofuran, 1,4-dioxolane, 4-methyl-1,3-dioxolane, diethyl ether, sulfolane, methyl sulfolane, acetonitrile, propiononitrile, acetic ester, butyl ate, propionic ester, or the like. These nonaqueous solvents may be independently used or a plurality of kinds of solvents may be mixed and used. Especially, the carbonate is preferably used in view of stability in oxidation.

In the nonaqueous electrolyte battery 1 according to the present invention, at least one or more materials selected from between vinylene carbonate, methoxybenzene compounds or antioxidants are added to the nonaqueous electrolyte solution.

Since the freezing point of the vinylene carbonate is located in the vicinity of 22° C., the nonaqueous electrolyte solution containing the vinylene carbonate can maintain good ionic conductivity even under an environment of low temperature. Thus, even when the nonaqueous electrolyte battery using the nonaqueous electrolyte solution containing the vinylene carbonate is used under the environment of low temperature, its battery property is not deteriorated and its cyclic characteristic at low temperature is excellent.

The methoxybenzene compounds effectively suppresses the deterioration of capacity generated when the battery is kept under a charged state at room temperature, as disclosed in, for instance, Japanese Patent Application Laid-open No. hei.7-302614. As the methoxybenzene compounds, there may be exemplified 4-fluoroanisole, 2,4-difluoroanisole, 2-bromoanisole, 2,3,5,6-tetrafluoro-4-methylanisole, or the like.

However, the vinylene carbonate and the nonaqueous solvents used for the nonaqueous electrolyte solution are extremely apt to be decomposed by oxygen radicals generated in the battery under an environment of high temperature.

Thus, in the nonaqueous electrolyte battery according to the first aspect of the present invention, the antioxidant is added to the nonaqueous electrolyte solution. The antioxidant is added to the nonaqueous electrolyte solution so that the decomposition of the vinylene carbonate or other nonaqueous solvents by the oxygen radicals can be suppressed and the cyclic characteristic under high temperature can be improved. As the antioxidants, for example, quinones, aromatic amines, phenols, vitamin E, vitamin C, sesamoles, quercetins, or the like can be employed.

According to the second aspect of the present invention, these vinylene carbonate, methoxybenzene compounds, or antioxidants may be independently added to the nonaqueous electrolyte solution, however, two or more of them may be preferably combined together and the obtained mixture may be added to the nonaqueous electrolyte solution in order to obtain the effects of the second invention.

Figure 4:
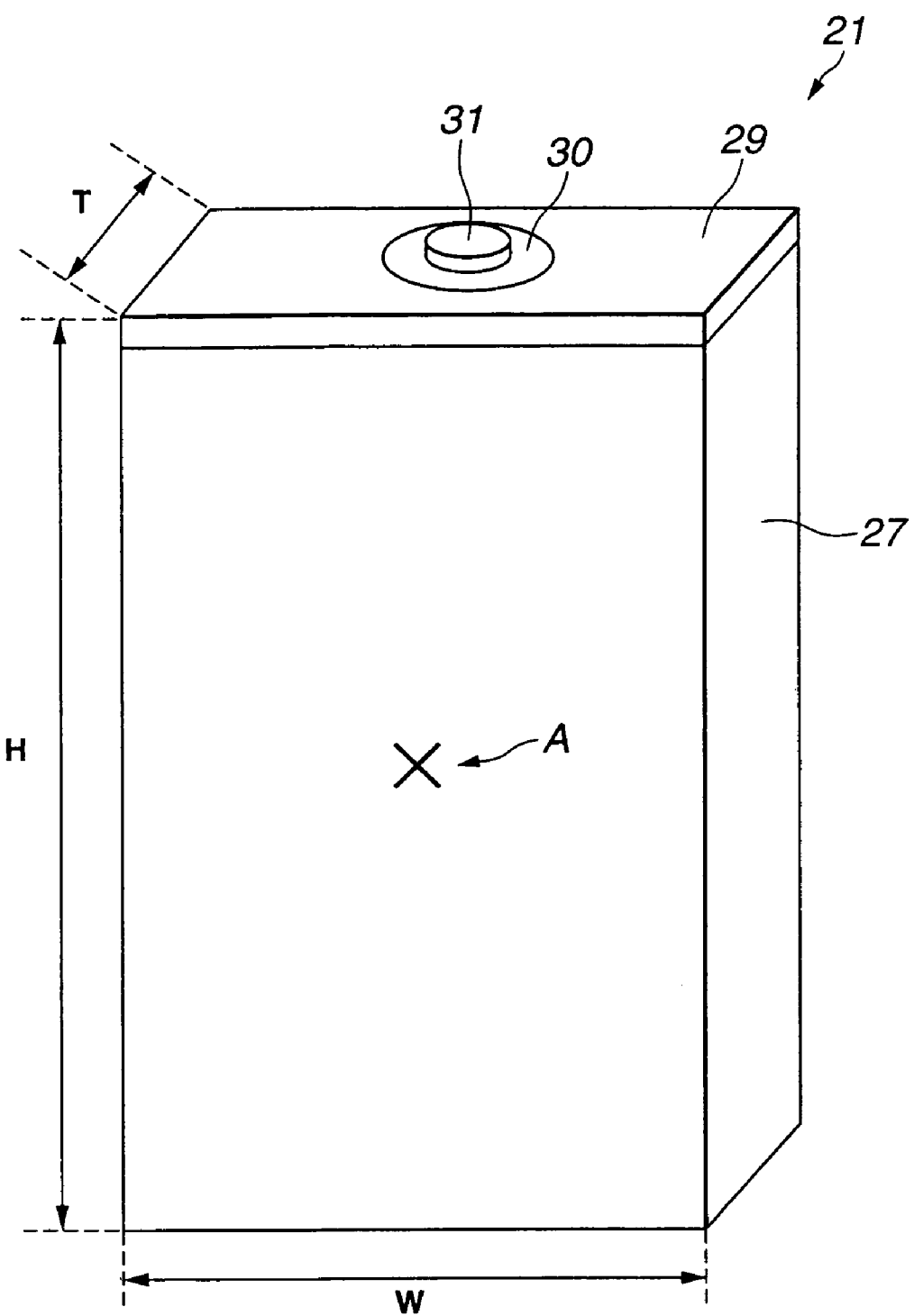
FIG. 4 is a perspective view showing one embodiment of a nonaqueous electrolyte battery according to the present invention.

The nonaqueous electrolyte solution containing unsaturated cyclic carbonate and/or halogenated methoxybenzene compounds, particularly, the vinylene carbonate expressed by Chemical Formula 1 below, and 2,4-difluoroanisole expressed by Chemical Formula 2 below, is employed, and accordingly, the generation of gas which results from the decomposition of the nonaqueous electrolyte solution can be prevented even when the battery is exposed to the high temperature. Thus, even when the battery in a rectangular flat battery can 27 shown in FIG. 4 is kept under high temperature, the expansion of the battery can 27 due to the generation of gas therein can be suppressed.

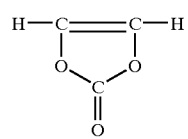

[Chemical Formula 1]

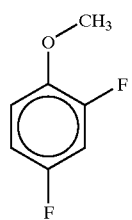

[Chemical Formula 2]

Generally, in the nonaqueous electrolyte battery having the vinylene carbonate added to the nonaqueous electrolyte solution, a low temperature characteristic is improved, however, a storage property under high temperature is extremely degraded. As a result of the examination of the inventors of the present invention, it was found that the capacity of the battery was extremely degraded when the battery was left for a long time under the environment of high temperature.

In other words, the nonaqueous electrolyte solution containing the vinylene carbonate was seriously apt to be decomposed by the oxygen radicals generated in the battery when the battery is stored under the environment of high temperature.

Thus, according to the present invention, 2,4-difluoroanisole as the halogenated methoxybenzene compound is added to the nonaqueous electrolyte solution as well as the vinylene carbonate. The 2,4-difluoroanisole serves to supplement the oxygen radicals to suppress the reaction of the nonaqueous electrolyte solution, particularly, the vinylene carbonate with the oxygen radicals.

Therefore, in the nonaqueous electrolyte battery 1 according to the present invention, even when the battery is kept in the environment of high temperature, 2,4-difluoroanisole supplements the generated oxygen radicals, so that the decomposition of the nonaqueous electrolyte solution as well vinylene carbonate can be suppressed and the generation of gas can be prevented.

In this case, even when only 2,4-difluoroanisole is added to the nonaqueous electrolyte solution, an irreversible reaction in the cathode and the anode under a severe oxidation and deoxidation atmosphere in the battery generated in a charged state can be suppressed to effectively prevent the deactivation of the active material.

However, when the vinylene carbonate is added to the nonaqueous electrolyte solution together with the methoxybenzene compounds, the vinylene carbonate reacts on the active material, and produces a reaction product compound on the surface of the active material at the same time upon reaction, therefore suppressing the degradation of capacity due to the methoxybenzene compound as above mentioned, so that a higher suppressing effect may be possibly realized.

The content of vinylene carbonate in the nonaqueous electrolyte solution is preferably located within a range of 0.3 wt % or more to 1.2 wt % or lower. The content of 2,4-difluoroanisole in the nonaqueous electrolyte solution is preferably located within a range of 0.05 mol/l or more to 0.3 mol/l or lower.

When the content of the vinylene carbonate is lower than 0.3 wt %, an effect for suppressing the generation of gas under the environment of high temperature and the expansion of the battery can 7 cannot be sufficiently obtained. Further, when the content of 2,4-difluoroanisole is less than 0.05 mol/l, an effect for supplementing the oxygen radicals and preventing the decomposition of the vinylene carbonate under the environment of the high temperature cannot be completely obtained. Further, when the content of the vinylene carbonate exceeds 1.2 wt %, or the content of 2,4-difluoroanisole exceeds 0.3 mol/l, the battery property of the nonaqueous electrolyte battery 1 will be deteriorated.

As described above, in the nonaqueous electrolyte battery 1 according to the embodiment of the present invention, the vinylene carbonate effective for improving the cyclic characteristic at low temperature, the methoxybenzene compound effective for improving the cyclic characteristic at ambient temperature and the antioxidant effective for improving the cyclic characteristic at high temperature are combined together and employed so that the cyclic characteristic can be improved in a wider range of temperature.

The amount of addition of vinylene carbonate is preferably located within a range of 0.05 wt % or more to 20 wt % or lower relative to all the nonaqueous electrolyte solution. When the amount of addition of vinylene carbonate is less than 0.05 wt %, the effect for improving the cyclic characteristic cannot be sufficiently obtained. Further, when the amount of addition of vinylene carbonate is too much, the capacity of the battery is caused to be deteriorated. The amount of addition of the vinylene carbonate is located within the above described range, so that the cyclic characteristic of the battery can be enhanced without deteriorating the capacity of the battery. A more preferable amount of addition of the vinylene carbonate ranges from 0.08 wt % or more to 15 wt % or lower relative to all the nonaqueous electrolyte solution.

The amount of addition of methoxybenzene compound is preferably located within a range of 0.01 wt % or more to 10 wt % or lower relative to all the nonaqueous electrolyte solution. When the amount of addition of the methoxybenzene compound is less than 0.05 wt %, the effect for improving the cyclic characteristic cannot be sufficiently attained. Further, when the amount of addition of the methoxybenzene compound is too much, the capacity of the battery will be deteriorated. The amount of addition of the methoxybenzene compound is located within the above described range, so that the cyclic characteristic of the battery can be improved without generating the degradation of the capacity in the battery. A more preferable amount of addition of the methoxybenzene ranges from 0.02 wt % or more to 10 wt % or lower relative to all the nonaqueous electrolyte solution.

According to the second aspect of the nonaqueous electrolyte battery of the present invention, the content of the vinylene carbonate is located within a range of 0.3 wt % or more to 1.2 wt % or lower and the content of 2,4-difluoroanisole ranges from 0.05 mol/l or more to 0.3 mol/l or lower, so that even when the battery is kept under high temperature, the decomposition of the nonaqueous electrolyte solution can be suppressed, and the generation of gas resulting from the decomposition of the nonaqueous electrolyte solution can be prevented. Further, a more preferable content of vinylene carbonate is located within a range of 0.6 wt % to 1.0 wt % and a more preferable content of 2,4-difluoroanisole is located within a range of 0.1 mol/l or more to 0.3 mol/l or lower.

Since the vinylene carbonate effective for improving the cyclic characteristic at low temperature, the methoxybenzene compound effective for improving the cyclic characteristic at ambient temperature and the antioxidant effective for improving the cyclic characteristic at high temperature are combined together and employed in the nonaqueous electrolyte battery 1 according to the above described embodiment, the cyclic characteristic is improved in a wider range of temperature.

The nonaqueous electrolyte battery 1 is manufactured in the following manner. It is to be understood that a method for manufacturing the battery according to the present invention is not limited to examples described below.

The cathode 2 is manufactured by uniformly applying the cathode compound mixture including the cathode active material and the binding agent to a metallic foil such as an aluminum foil serving as a cathode current collector and drying the cathode compound mixture to form a cathode active material layer. As the binding agent of the cathode compound mixture, not only a well-known binding agent can be used, but also a well-known additive agent or the like can be added to the cathode compound mixture.

The anode 3 is manufactured by uniformly applying the anode compound mixture including the anode active material and the binding agent to a metallic foil such as a copper foil serving as an anode current collector and drying the anode compound mixture to form an anode active material layer. As the binding agent of the anode compound mixture, a well-known binding agent can be used, and further, a well-known additive agent or the like can be added to the anode compound mixture.

The cathode 2 and the anode 3 formed in such a manner are allowed to come into tight contact with each other through the separator 4 made of, for instance, the microporous polypropylene film, and the obtained laminated body is coiled spirally many times to form a spirally coiled electrode body.

Then, an insulating plate 6 is inserted into the bottom part of an iron battery can 5 to the inside of which a nickel plating is applied and the spirally coiled electrode body is accommodated in the iron battery can 5. Then, in order to collect the electric current of the anode, one end of an anode lead 7 made of, for instance, nickel is pressed to the anode 3 and the other end thereof is welded to the battery can 5. Thus, the battery can 5 is conductively connected to the anode 3 to serve as the external anode of the nonaqueous electrolyte battery 1. Further, in order to collect electric current of the cathode 2, one end of a cathode lead 8 made of, for instance, aluminum is attached to the cathode 2 and the other end is electrically connected to a battery cover 10 through a current shutting-off thin plate 9. This current shutting-off thin plate 9 serves to shut off the electric current in accordance with the internal pressure of the battery. Thus, the battery cover 10 is conductively connected to the cathode 2 to serve as the external cathode of the nonaqueous electrolyte battery 1.

Then, the nonaqueous electrolyte solution is injected into the battery can 5. This nonaqueous electrolyte solution is prepared by dissolving an electrolyte in the nonaqueous solvent. At least one or more kinds of materials selected from between the vinylene carbonate, the methoxybenzene compounds or the antioxidants are added to the nonaqueous electrolyte solution.

Subsequently, the battery can 5 is caulked through an insulating seal gasket 11 to which asphalt is applied so that the battery cover 10 is fixed to the battery can to form a cylindrical nonaqueous electrolyte battery 1.

In the nonaqueous electrolyte battery 1, as shown in FIG. 1, a center pin 12 is provided. There are provided a safety valve device 13 for exhausting gas in the battery when the pressure in the battery is higher than a prescribed value and a PTC element 14 for preventing the rise of temperature in the battery.

In the above described embodiment, although the nonaqueous electrolyte battery using the nonaqueous electrolyte solution is described as an example, it is to be understood that the present invention is not limited thereto, and the present invention may be applied to a solid electrolyte battery using a solid polymer electrolyte containing the one or more substances or the mixture of conductive polymer compounds or a gel electrolyte battery using a gel solid electrolyte including a swelling solvent.

As the conductive polymer compounds contained in the solid polymer electrolyte or the gel electrolyte, there are specifically exemplified silicone, acrylic polymer, acrylonitrile, modified polyphosphazene polymer, polyethylene oxide, polypropylene oxide, fluorinated polymer or composite polymers or cross-linked polymers or modified polymers of these compounds, or the like. As the fluorinated polymers, there may be enumerated polyvinylidene fluoride, polyvinylidene fluoride-co-hexafluoropropylene, polyvinylidene fluoride-co-tetrafluoroethylene, polyvinylidene fluoride-co-trifluoroethylene, or the like.

Further, in the above described embodiment, although the secondary battery is described as an example, it is to be recognized that the present invention is not limited thereto, and the present invention may be applied to a primary battery. Further, needless to say, the configuration of the battery of the present invention is not particularly limited, and accordingly, a cylindrical shape, a rectangular shape, a coin shape, a button shape, or the like may be employed. Still further, various kinds of size of batteries such as a thin type, a large type, or the like may be utilized.

EXAMPLES

Subsequently, a first example will be described below to recognize the effects of the present invention. A battery including $LiMO_2$ (M includes at least one kind or more of Co and Ni.) as a cathode active material was used.

A rectangular nonaqueous electrolyte secondary battery 21 shown in FIG. 4 and FIG. 5 was manufactured in the following manner.

<Sample 1>

Initially, petroleum pitch suitably selected from a range of 0.6 to 0.8 in the atomic ratio of H/C was pulverized, and the pulverized product was subjected to an oxidation treatment in an air current to obtain a carbon precursor. The quinoline insoluble matter (JIS centrifuge method: K2425-1983) of the carbon precursor was 80% and the content of oxygen (in accordance with an organic elemental analysis) was 15.4 wt %.

The carbon precursor was thermally treated in nitrogen air current by raising temperature to 1000° C., and then, the thermally treated carbon precursor was pulverized to obtain carbon material powder with average particle size of 10 μm. When an X-ray diffraction measurement was carried out for a non-graphitizable carbon material obtained at this time, the spacing of a (002) plane was 0.381 nm and a specific density was 1.54 g/cm$^3$.

Ninety parts by weight of the carbon material was mixed with 10 parts by weight of polyvinylidene fluoride as a binder or a binding agent to prepare an anode compound mixture. This anode compound mixture was dispersed in N-methyl-2-pyrrolidone as a solvent to have slurry and prepare the anode slurry.

Then, the anode slurry obtained in such a manner was uniformly applied to both the surfaces of a bond shape copper foil with the thickness of 15 μm serving as an anode current collector, dried and the dried slurry was compressed and formed by a roll press machine to manufacture a bond shape anode 23.

A cathode 2 was manufactured in such a manner as described below.

Lithium carbonate was mixed with cobalt carbonate in the ratio 0.5 mol:1.0 mol, and the mixture was sintered in air for 5 hours at 900° C. to obtain $LiCoO_2$ having the particle size of 5.0±2.0 μm.

Then, 91 parts by weight of $LiCoO_2$ obtained in such a way, 6 parts by weight of graphite as a conductive agent and 3 parts by weight of polyvinylidene fluoride as the binder or the binding agent were mixed together to prepare a cathode mixture. This cathode mixture was dispersed in N-methyl-2-pyrrolidone as the solvent to have slurry and prepare the cathode slurry.

Then, the cathode slurry got in such a way was uniformly applied to both the surfaces of a bond shape aluminum foil with the thickness of 20 μm serving as a cathode current collector, dried and the dried cathode slurry was compressed and formed by the roll press machine to form the bond shape cathode 22.

The bond shape anode 23 and the bond shape cathode 22 formed as described above were laminated through separators 24 made of microporous polypropylene film with the thickness of 20 μm, and stacked the anode 23, the separator 24, the cathode 22 and the separator 24 respectively, and the laminated body was coiled many times. Then, the last end part of the copper foil as the anode current collector located at an outermost periphery was fixed by an element adhesive tape 33 with the width of 40 mm to form an electrode element 25 as shown in FIG. 5.

Figure 5:
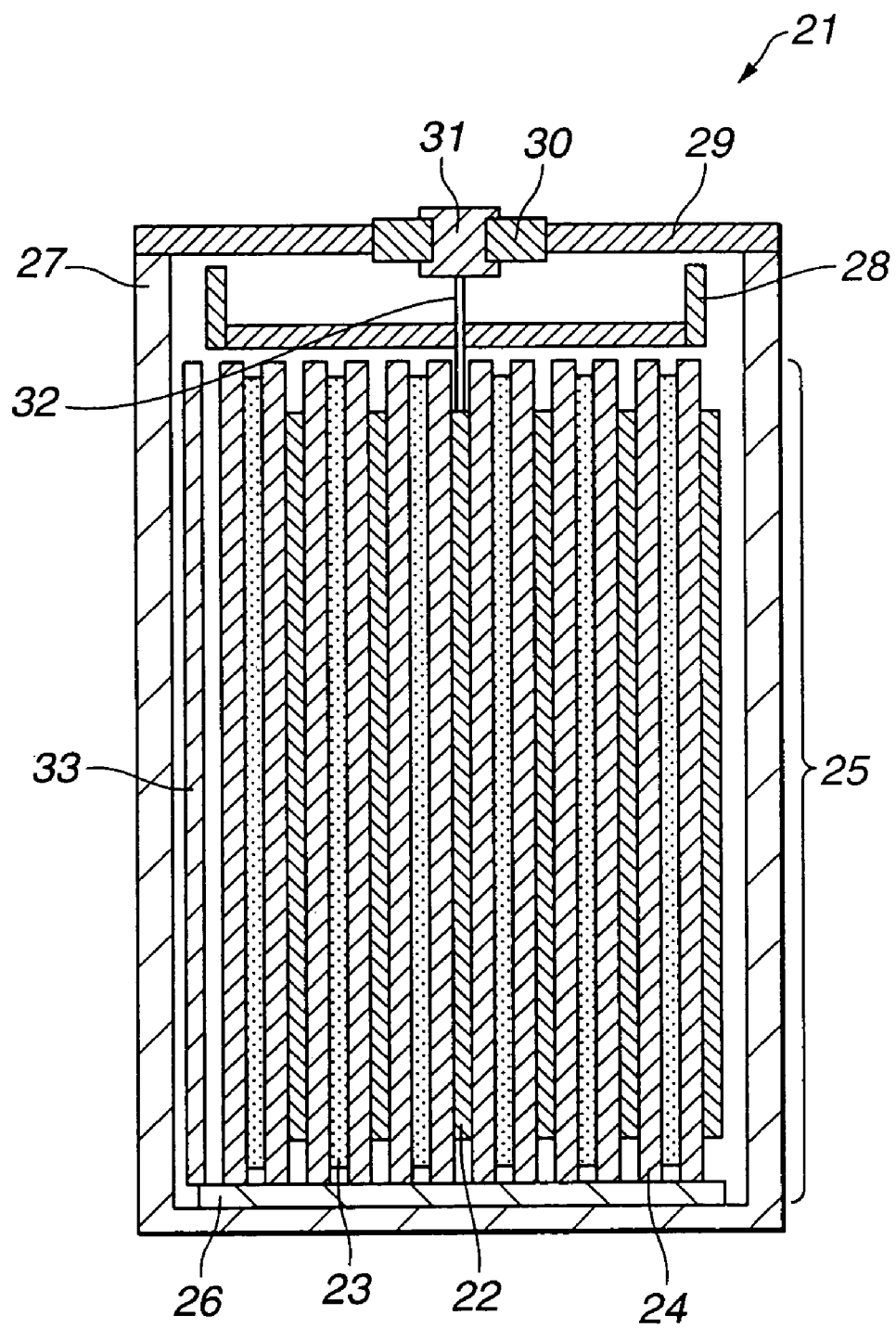
FIG. 5 is a longitudinally sectional view of the nonaqueous electrolyte battery shown in FIG. 4.

The electrode element 25 manufactured as described above was accommodated in a flat battery can 27 to which a nickel plating is applied and an insulating sheet 26 were interposed on the lower end faces of the electrode element 25 as shown in FIG. 5.

Then, a cathode lead 32 made of aluminum was drawn from the cathode current collector, welded to a cathode terminal 31 previously attached to a battery cover 29 through a gasket 30 and the battery can 27 is fixed to the battery cover 29 by a laser welding as shown in FIG. 5.

Then, $LiPF_6$ was dissolved in the solvent containing the mixture of equal amount of ethylene carbonate and dimethyl carbonate at the rate of 1.0 mol/l. Further, 2,4-difluoroanisole was added to the obtained electrolyte solution at the rate of 0.1 mol/l. Thus, the prepared electrolyte solution was injected from an electrolyte solution injection port. The electrolyte solution injection port was welded to maintain the airtightness in the battery. Thus, the rectangular nonaqueous secondary battery 21 as shown in FIGS. 4 and 5 having the height (H) of 48 mm, the width (W) of 34 mm and the thickness (T) of 6 mm was manufactured.

<Sample 2>

A rectangular type nonaqueous electrolyte secondary battery was manufactured in the same manner as that of the sample 1 except that vinylene carbonate was added to the nonaqueous electrolyte solution at the rate of 0.6 wt % and 2,4-difluoroanisole was added to the nonaqueous electrolyte solution at the rate of 0.1 mol/l.

<Sample 3>

A rectangular type nonaqueous electrolyte secondary battery was manufactured in the same manner as that of the sample 1 except that vinylene carbonate was added to the nonaqueous electrolyte solution at the rate of 1.0 wt % and 2,4-difluoroanisole was added to the nonaqueous electrolyte solution at the rate of 0.1 mol/l.

<Sample 4>

A rectangular type nonaqueous electrolyte secondary battery was manufactured in the same manner as that of the sample 1 except that vinylene carbonate was added to the nonaqueous electrolyte solution at the rate of 1.5 wt % and 2,4-difluoroanisole was added to the nonaqueous electrolyte solution at the rate of 0.1 mol/l.

<Sample 5>

A rectangular type nonaqueous electrolyte secondary battery was manufactured in the same manner as that of the sample 1 except that vinylene carbonate was added to the nonaqueous electrolyte solution at the rate of 2.0 wt % and 2,4-difluoroanisole was added to the nonaqueous electrolyte solution at the rate of 0.1 mol/l.

<Sample 6>

A rectangular type nonaqueous electrolyte secondary battery was manufactured in the same manner as that of the sample 1 except that any material was not added to the nonaqueous electrolyte solution.

<Sample 7>
A rectangular type nonaqueous electrolyte secondary battery was manufactured in the same manner as that of the sample 1 except that vinylene carbonate was added to the nonaqueous electrolyte solution at the rate of 0.3 wt %.

<Sample 8>
A rectangular type nonaqueous electrolyte secondary battery was manufactured in the same manner as that of the sample 1 except that vinylene carbonate was added to the nonaqueous electrolyte solution at the rate of 0.6 wt %.

<Sample 9>
A rectangular type nonaqueous electrolyte secondary battery was manufactured in the same manner as that of the sample 1 except that vinylene carbonate was added to the nonaqueous electrolyte solution at the rate of 0.9 wt %.

<Sample 10>
A rectangular type nonaqueous electrolyte secondary battery was manufactured in the same manner as that of the sample 1 except that vinylene carbonate was added to the nonaqueous electrolyte solution at the rate of 1.0 wt %.

<Sample 11>
A rectangular type nonaqueous electrolyte secondary battery was manufactured in the same manner as that of the sample 1 except that vinylene carbonate was added to the nonaqueous electrolyte solution at the rate of 1.2 wt %.

<Sample 12>
A rectangular type nonaqueous electrolyte secondary battery was manufactured in the same manner as that of the sample 1 except that vinylene carbonate was added to the nonaqueous electrolyte solution at the rate of 2.0 wt %.

<Sample 13>
A rectangular type nonaqueous electrolyte secondary battery was manufactured in the same manner as that of the sample 1 except that vinylene carbonate was added to the nonaqueous electrolyte solution at the rate of 3.0 wt %.

<Sample 14>
A rectangular type nonaqueous electrolyte secondary battery was manufactured in the same manner as that of the sample 1 except that vinylene carbonate was added to the nonaqueous electrolyte solution at the rate of 0.6 wt % and 2,4-difluoroanisole was added to the nonaqueous electrolyte solution at the rate of 0.05 mol/l.

<Sample 15>
A rectangular type non aqueous electrolyte secondary battery was manufactured in the same manner as that of the sample 1 except that vinylene carbonate was added to the nonaqueous electrolyte solution at the rate of 0.6 wt % and 2,4-difluoroanisole was added to the nonaqueous electrolyte solution at the rate of 0.1 mol/l.

<Sample 16>
A rectangular type nonaqueous electrolyte secondary battery was manufactured in the same manner as that of the sample 1 except that vinylene carbonate was added to the nonaqueous electrolyte solution at the rate of 0.6 wt % and 2,4-difluoroanisole was added to the nonaqueous electrolyte solution at the rate of 0.2 mol/l.

<Sample 17>
A rectangular type nonaqueous electrolyte secondary battery was manufactured in the same manner as that of the sample 1 except that vinylene carbonate was added to the nonaqueous electrolyte solution at the rate of 0.6 wt % and 2,4-difluoroanisole was added to the nonaqueous electrolyte solution at the rate of 0.3 mol/l.

<Sample 18>
A rectangular type nonaqueous electrolyte secondary battery was manufactured in the same manner as that of the sample 1 except that 2,4-difluoroanisole was added to the nonaqueous electrolyte solution at the rate of 0.05 mol/l.

<Sample 19>
A rectangular type nonaqueous electrolyte secondary battery was manufactured in the same manner as that of the sample 1 except that 2,4-difluoroanisole was added to the nonaqueous electrolyte solution at the rate of 0.2 mol/l.

<Sample 20>
A rectangular type nonaqueous electrolyte secondary battery was manufactured in the same manner as that of the sample 1 except that 2,4-difluoroanisole was added to the nonaqueous electrolyte solution at the rate of 0.3 mol/l.

In the battery manufactured as described above, after the battery was charged under constant-voltage of 4.2 V and constant-current of 280 mA for 5 hours, the thickness (T1) of the battery can 27 was measured. The thickness of the battery can 27 measured at the center of the side surface of the battery can 27, that is, a part A indicated by a mark X in FIG. 4 was considered to be a maximum thickness. Further, after charging under voltage or 4.2 V, the battery can 27 was kept for 168 hours at 80° C. and then, the thickness (T2) of the battery can 27 was measured. Then, the rate (%) of increase of thickness of the battery can was calculated from (T2−T1)/T2×100.

Figure 6:
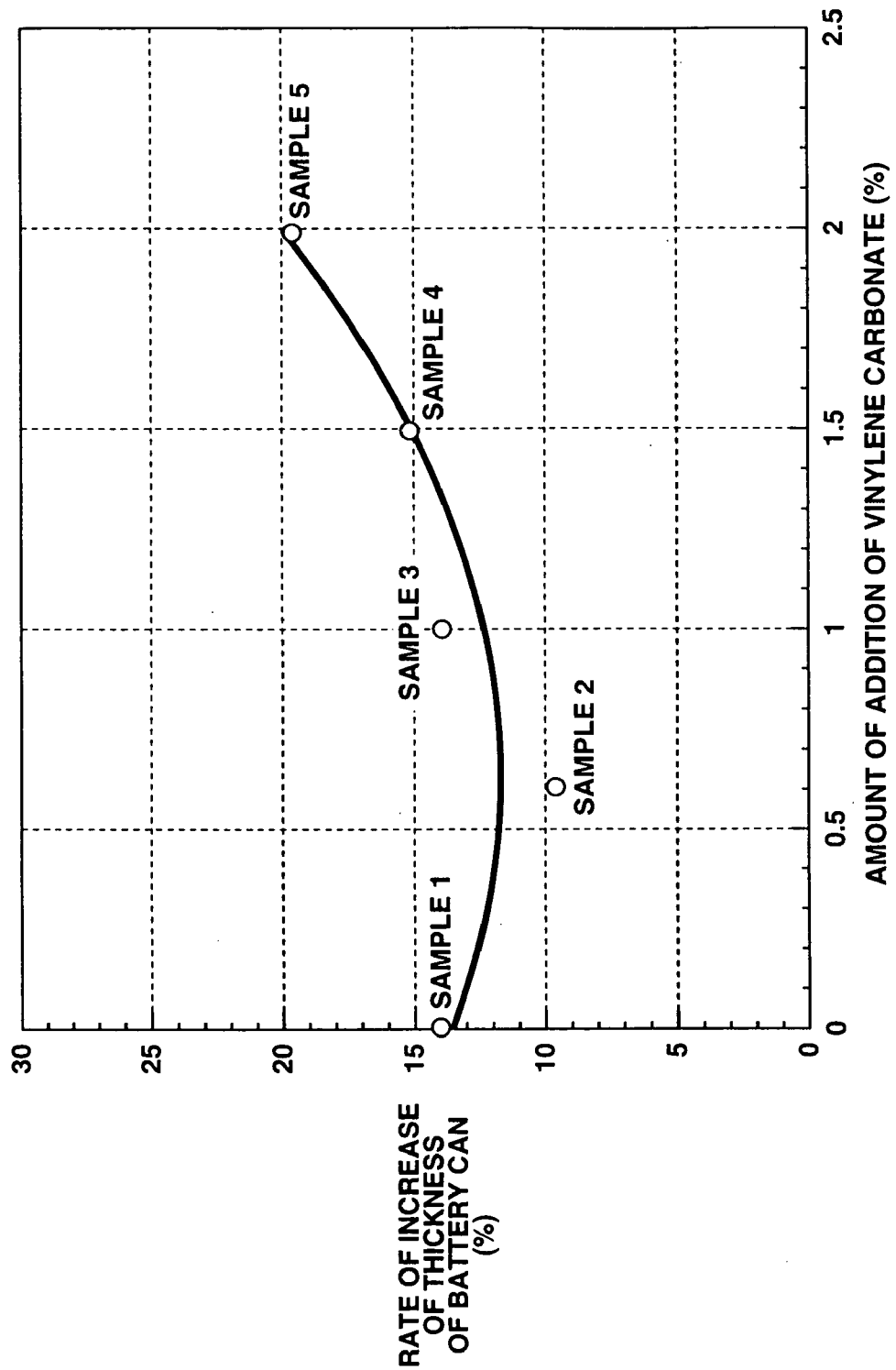
FIG. 6 is a diagram showing the relation between the amount of addition of vinylene carbonate and the rate of increase of thickness of a battery can in a battery with both vinylene carbonate and 2,4-difluoroanisole added to a nonaqueous electrolyte.

In the batteries of the samples 1 to 5 to which both vinylene carbonate and 2,4-difluoroanisole are added while changing the amount of addition of the vinylene carbonate, the relation between the amount of addition of vinylene carbonate and the rate of increase of thickness of the battery can is initially shown in FIG. 6.

As apparent from FIG. 6, the rate of increase of thickness of the battery can is decreased more in the samples 2 to 3 to which the vinylene carbonate is added within a range of 0.3 wt % or more to 1.2 wt % or lower than that in the sample 1 to which the vinylene carbonate is not added.

It is estimated that the above phenomenon appears, because the vinylene carbonate is decomposed during an initial charge and the surface of the anode is covered with the decomposed product so that the decomposition of the electrolyte solution under high temperature and the generation of gas due to the decomposition of the electrolyte solution are prevented.

However, in the samples 4 and 5 to which 1.2 wt % or more of the vinylene carbonate is added, the vinylene carbonate which is not decomposed and remains during the first charging operation is continuously decomposed under the high temperature so that the expansion of the battery can is increased.

Therefore, it is understood that the amount of addition of vinylene carbonate has an optimum value, and when the amount of addition of vinylene carbonate ranges from 0.3 wt % or more to 1.2 wt % or lower, the rate of increase of thickness the battery can is low and the expansion of the battery can is suppressed. Further, it is understood that, when the amount of addition of vinylene carbonate is located within a range of 0.6 wt % or more to 1.0 wt % or lower, a preferable effect is specially obtained.

Figure 7:
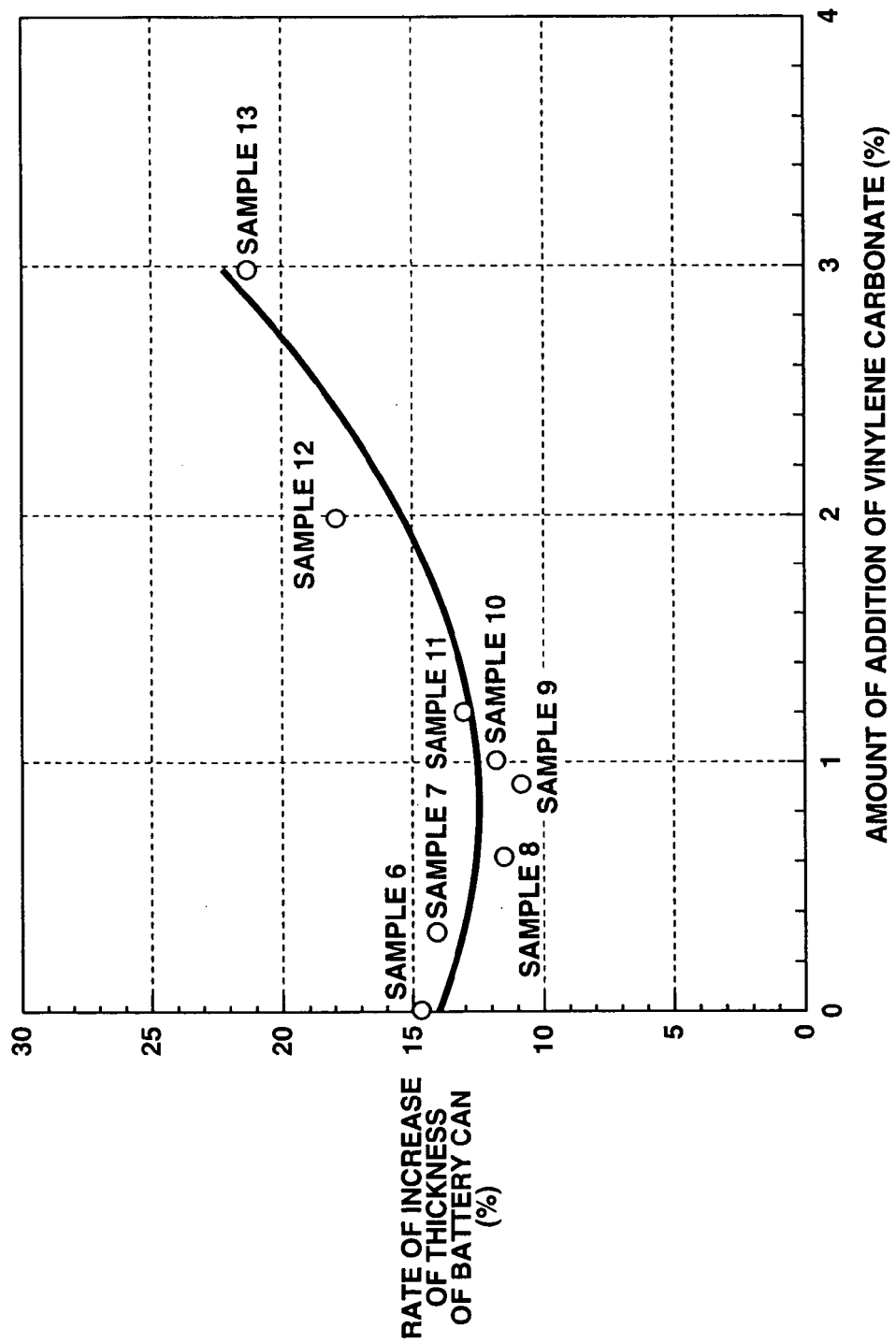
FIG. 7 is a diagram showing the relation between the amount of addition of vinylene carbonate and the rate of increase of thickness of a battery can in a battery with only vinylene carbonate added to a nonaqueous electrolyte.

For the batteries of the samples 6 to 13 to which only vinylene carbonate is added while changing the amount of addition of the vinylene carbonate, the relation between the amount of addition of vinylene carbonate and the rate of increase of thickness of the battery can is shown in FIG. 7.

As apparently shown in FIG. 7, when only the vinylene carbonate is added to the nonaqueous electrolyte solution, when the amount of addition of vinylene carbonate ranges from 0.3 wt % or more to 1.2 wt % or lower, a desired effect can be obtained.

As can be understood from the comparison between FIG. 6 and FIG. 7, when the amount of addition of vinylene carbonate is the same, an effect for suppressing the increase of thickness of the battery can appears more obviously in FIG. 6 to which both the vinylene carbonate and 2,4-difluoroanisole are added than in FIG. 7.

It is estimated that this phenomenon appears, because both the vinylene carbonate and 2,4-difluoroanisole are decomposed during the initial charge and the surface of the anode is covered with the decomposed product to prevent the decomposition of the electrolyte solution under high temperature. Further, it is estimated that the surface coat of both the vinylene carbonate and 2,4-difluoroanisole more decomposes the electrolyte solution under the high temperature than that of only vinylene carbonate.

Therefore, both the vinylene carbonate and 2,4-difluoroanisole are added to the electrolyte solution, so that the generation of gas due to the decomposition of the electrolyte solution can be apparently prevented and the expansion of the battery can be more effectively suppressed.

Figure 8:
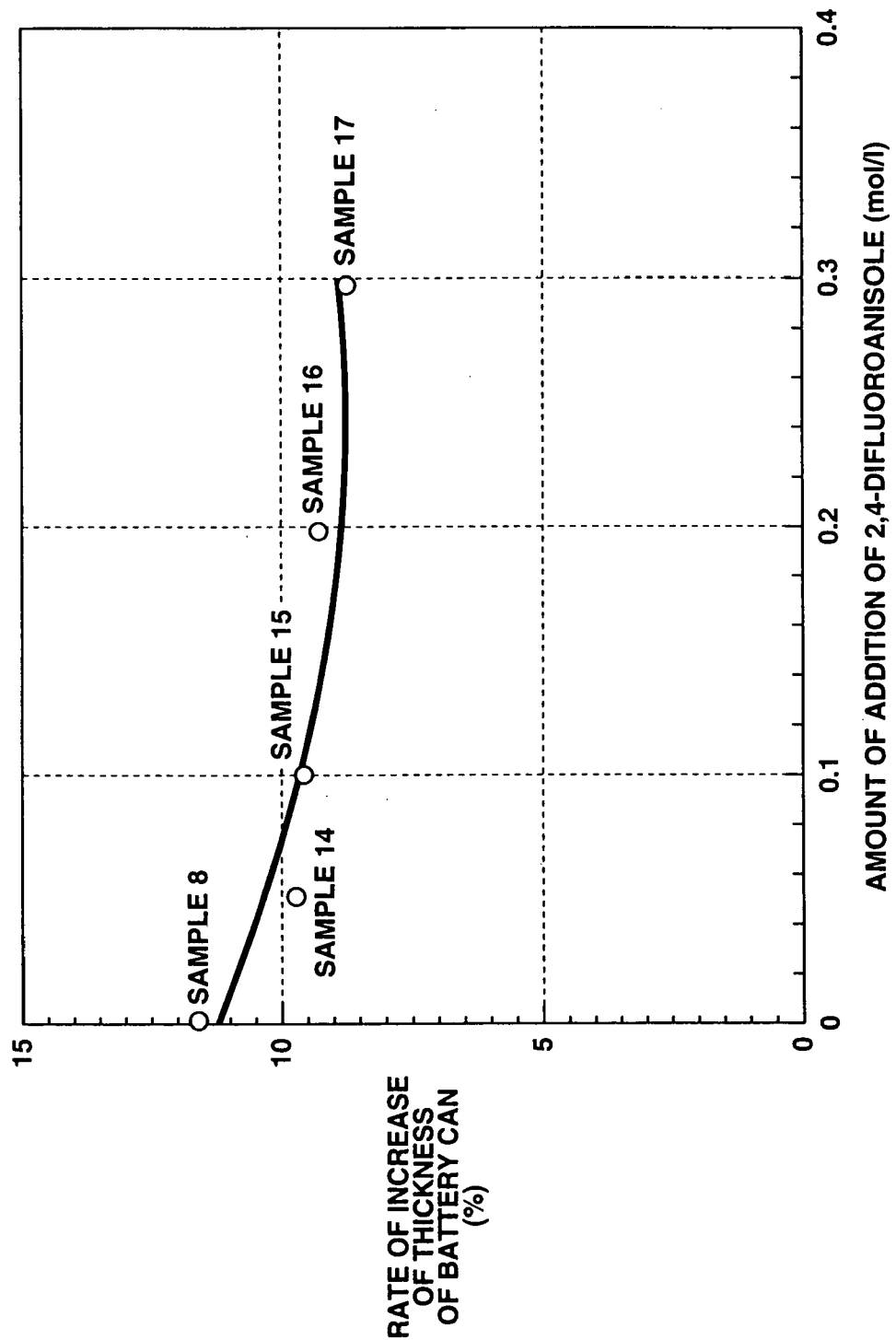
FIG. 8 is a diagram showing the relation between the amount of addition of 2,4-difluoroanisole and the rate of increase of thickness of a battery can in a battery with both vinylene carbonate and 2,4-difluoroanisole added to a nonaqueous electrolyte.

Subsequently, for the batteries of the sample 8, and the samples 14 to 17 to which both the vinylene carbonate and 2,4-difluoroanisole are added while changing the amount of addition of 2,4-difluoroanisole, the relation between the amount of addition of 2,4-difluoroanisole and the rate of increase of thickness of the battery can is shown in FIG. 8.

As shown in FIG. 8, the rate of increase of thickness of the battery can is reduced more in the samples 14 to 17 to which 2,4-difluoroanisole is added within a range of 0.05 mol/l or more to 0.3 mol/l or lower than that of the sample 8 to which 2,4-difluoroanisole is not added. On the other hand, it is recognized that, when 2,4-difluoroanisole is added at the rate of 0.3 mol/l or more, the expansion of the battery can is increased.

Therefore, the amount of addition of 2,4-difluoroanisole has an optimum value. It is recognized that, when the amount of addition of 2,4-difluoroanisole is located within a range of 0.05 mol/l or more to 0.3 mol/l or lower, the rate of increase of thickness of the battery can be decreased and the expansion of the battery can be suppressed. When the amount of addition of 2,4-difluoroanisole ranges from 0.1 mol/l or more to 0.3 mol/l or lower, a specially preferable effect can be obtained.

Figure 9:
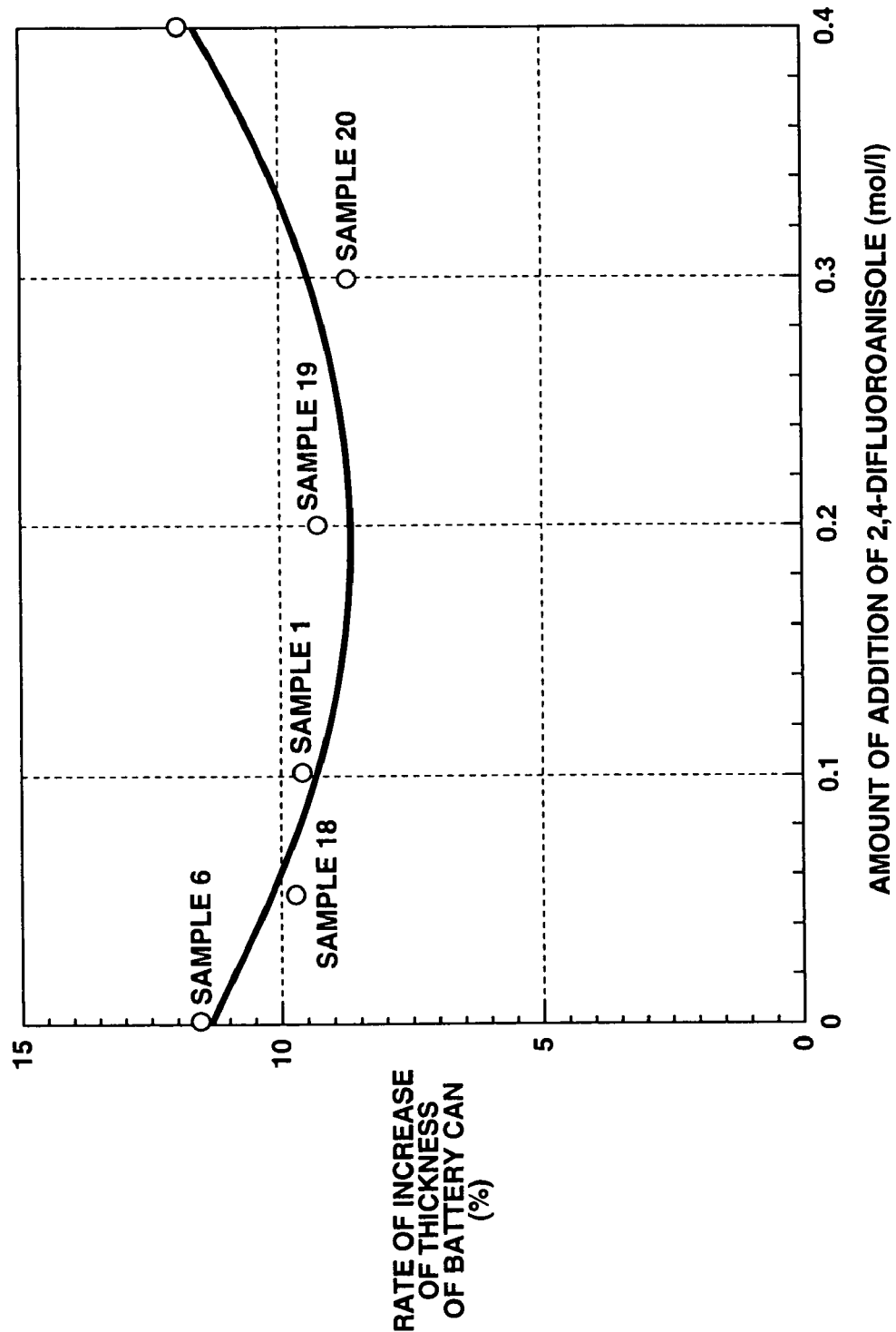
FIG. 9 is a diagram showing the relation between the amount of addition of 2,4-difluoroanisole and the rate of increase of thickness of a battery can in a battery with only 2,4-difluoroanisole added to a nonaqueous electrolyte.

Further, for the batteries of the sample 1, the sample 6 and the samples 18 to 20 to which 2,4-difluoroanisole is added while changing the amount of addition of 2,4-difluoroanisole, the relation between the amount of addition of 2,4-difluoroanisole and the rate of increase of thickness of the battery can is shown in FIG. 9.

As apparent from FIG. 9, even when only 2,4-difluoroanisole is added to the electrolyte solution, a desired effect can be obtained, when the amount of addition is located within a range of 0.05 mol/l or more to 0.3 mol/l or lower.

As can be understood from the comparison between FIG. 8 and FIG. 9, when the amount of addition of 2,4-difluoroanisole is the same, an effect for suppressing the increase of thickness of the battery can appears more obviously in FIG. 8 to which both the vinylene carbonate and 2,4-difluoroanisole are added than in FIG. 9.

Now, a second example carried out to recognize the effects of the present invention will be described below.

[Examination of Amount of Vinylene Carbonate]

Initially, in examples 1 to 14, the amount of vinylene carbonate was respectively changed to form batteries and the characteristics thereof were evaluated.

Example 1

Initially, 30 parts by weight of coal tar pitch as a binder was added to 100 parts by weight of coal coke as a filler, they were mixed together at about 100° C., and then, the mixture was compressed and formed by a press to obtain a precursor of a carbon compact. Thus, the precursor was thermally treated at 1000° C. or lower to obtain a carbon material compact. The carbon material compact was repeatedly subjected to a pitch impregnating/sintering process in which the carbon material compact was impregnated with the binder pitch melted at 200° C. or lower and the resultant product was thermally treated at 1000° C. or lower. After that, the carbon compact was thermally treated in an inert atmosphere at 2800° C. to obtain a graphitized compact, the graphitized compact was pulverized and the pulverized products were classified to prepare sample powder.

When the graphitized material obtained at this time was subjected to an X-ray diffraction measurement, the interplanar spacing of a (002) plane was 0.337 nm, the thickness of the C-axis crystallite of the (002) plane was 50.0 nm, specific density according to a pycnometer method was 2.23 g/cm$^3$, and specific surface area according to the BET (Brunauer-Emmett-Teller) method was 1.6 m$^2$/g. Further, in the particle size distribution according to a laser diffraction method, an average particle size was 33.0 μm, 10% accumulation particle size was 13.3 μm, 50% accumulation particle size was 30.6 μm and 90% accumulation particle size was 55.7 μm. Further, the average value of rupture strength of graphite particles was 7.1 kgf/mm$^2$, and the bulk density thereof was 0.98 g/cm$^3$.

The bulk density was got in accordance with the JIS K-1469 as obviously described below.

Initially, a measuring cylinder with the capacity of 100 cm$^3$ whose mass was previously measured was positioned in an inclined state and gradually filled with the sample powder of 100 cm$^3$ by using a spoon. Then, all mass was measured up to a minimum scale of 0.1 g and the mass of the measuring cylinder was subtracted from all the mass to obtain the sample powder M.

Then, the measuring cylinder filled with the sample powder was covered with a cork stopper. The measuring cylinder under this state was dropped onto a rubber plate 50 times from the height of about 5 cm. As a result, since the sample powder in the measuring cylinder was compressed, the volume V of the compressed sample powder was read. Then, bulk density D (g/cm$^3$) was calculated by the following formula.

$$D = W/V$$

Here, D indicates bulk density (g/cm$^3$), W indicates the mass (g) of the sample powder in the measuring cylinder and V indicates the volume (cm$^3$) of the sample powder in the measuring cylinder after the cylinder is dropped 50 times.

Then, the sample powder acquired as described above was used as the anode active material to manufacture a cylindrical nonaqueous electrolyte battery.

Ninety parts by weight of the above mixed sample powder was mixed with 10 parts by weight of polyvinylidene fluoride (PVDF) as a binding agent to prepare an anode compound mixture, and the anode compound mixture was dispersed in N-methyl pyrrolidone as a solvent to make it slurry.

Subsequently, the anode compound mixture slurry was applied to both the surfaces of a bond shape copper foil with the thickness of 10 µm serving as an anode current collector, dried, and then, the dried slurry was compressed and formed under constant pressure to form a bond shape anode.

A cathode was manufactured in the following manner.

A cathode active material was manufactured in the following manner.

Initially, 0.25 mol of lithium carbonate, 0.9 mol of manganese dioxide and 0.05 mol of dichrome trioxide were mixed together and the mixture was sintered in air of 850° C. for 5 hours to obtain $LiMn_{1.8}Cr_{0.2}O_4$.

This $LiMn_{1.8}Cr_{0.2}O_4$ was pulverized to obtain $LiMn_{1.8}Cr_{0.2}O_4$ powder whose 50% accumulation particle size obtained in accordance with the laser diffraction method was 20 µm. Then, 95 parts by weight of the $LiMn_{1.8}Cr_{0.2}O_4$ was mixed with 5 parts by weight of lithium carbonate powder. Then, 91 parts by weight of this mixture, 6 parts by weight of flaky graphite as a conductive agent and 3 parts by weight of polyvinylidene fluoride as a binding agent were mixed together to prepare a cathode compound mixture. The cathode compound mixture was dispersed in N-methyl pyrrolidone to make it slurry.

Subsequently, the cathode slurry was applied to both the surfaces of a bond shape aluminum foil with the thickness of 20 µm serving as a cathode current collector and the slurry was dried and compressed and formed under constant pressure to form a bond shape cathode.

Then, the bond shape anode and the bond shape cathode manufactured as described above were laminated through separators made of microporous polypropylene film with the thickness of 25 µm, then stacked the anode, the separator, the cathode and the separator respectively. The obtained laminated body was coiled many times to obtain a spiral type electrode body whose outside diameter was 18 mm.

The spiral type electrode body manufactured in such a manner was accommodated in an iron battery can to which a nickel plating was applied. Then, an insulating plate were provided on lower end faces of the spiral type electrode body. A cathode lead made of aluminum was drawn from the cathode current collector and welded to a battery cover. An anode lead made of nickel was drawn from the anode current collector and welded to the battery can.

Nonaqueous electrolyte solution was injected into the battery can. This nonaqueous electrolyte solution was prepared in such a manner that $LiPF_6$, ethylene carbonate (EC), propylene carbonate (PC), dimethyl carbonate (DMC) and vinylene carbonate (VC) were mixed together at prescribed rate and further, a prescribed amount of 2,6-di-t-butyl-p-cresol (BHT) of phenols serving as an antioxidant was added to the mixture.

Here, the composition of the electrolyte solution included $LiPF_6$, EC, PC, DMC and VC in the weight ratio 10:27:5:55:3 and further, the BHT was added to the electrolyte solution at the rate of 30 ppm.

Finally, the battery can was caulked through an insulating seal gasket to the surface of which asphalt is applied so that a safety device having a current shutting-off mechanism, a PTC element and a battery cover were fixed to maintain airtightness in the battery. Thus, a cylindrical nonaqueous electrolyte secondary battery with the diameter of 18 mm the height of 65 mm was manufactured.

Example 2

A cylindrical nonaqueous electrolyte secondary battery was manufactured in the same manner as that of the Example 1 except that the composition of the nonaqueous electrolyte solution included $LiPF_6$, EC, PC, DMC, VC in the weight ratio 10:25:5:55:5 and further, the BHT was added to the nonaqueous solution at the rate of 50 ppm.

Example 3

A cylindrical nonaqueous electrolyte secondary battery was manufactured in the same manner as that of the Example 1 except that the composition of the nonaqueous electrolyte solution included $LiPF_6$, EC, PC, DMC, VC in the weight ratio 10:20:5:55:10 and further, the BHT was added to the nonaqueous solution at the rate of 100 ppm.

Example 4

A cylindrical nonaqueous electrolyte secondary battery was manufactured in the same manner as that of the Example 1 except that the composition of the nonaqueous electrolyte solution included $LiPF_6$, EC, PC, DMC, VC in the weight ratio 10:15:5:55:15 and further, the BHT was added to the nonaqueous solution at the rate of 150 ppm.

Example 5

A cylindrical nonaqueous electrolyte secondary battery was manufactured in the same manner as that of the Example 1 except that the composition of the nonaqueous electrolyte solution included $LiPF_6$, EC, PC, DMC, VC in the weight ratio 10:10:5:55:20 and further, the BHT was added to the nonaqueous solution at the rate of 200 ppm.

Example 6

A cylindrical nonaqueous electrolyte secondary battery was manufactured in the same manner as that of the Example 1 except that the composition of the nonaqueous electrolyte solution included $LiPF_6$, EC, PC, DMC, VC in the weight ratio 10:29:5:55:1 and further, the BHT was added to the nonaqueous solution at the rate of 10 ppm.

Example 7

A cylindrical nonaqueous electrolyte secondary battery was manufactured in the same manner as that of the Example 1 except that the composition of the nonaqueous electrolyte solution included $LiPF_6$, EC, PC, DMC, VC in the weight ratio 10:29.5:5:55:0.5 and further, the BHT was added to the nonaqueous solution at the rate of 5 ppm.

Example 8

A cylindrical nonaqueous electrolyte secondary battery was manufactured in the same manner as that of the Example 1 except that the composition of the nonaqueous electrolyte solution included $LiPF_6$, EC, PC, DMC, VC in the weight ratio 10:29.9:5:55:0.1 and further, the BHT was added to the nonaqueous solution at the rate of 1 ppm.

Example 9

A cylindrical nonaqueous electrolyte secondary battery was manufactured in the same manner as that of the Example 1 except that the composition of the nonaqueous electrolyte solution included LiPF$_6$, EC, PC, DMC, VC in the weight ratio 10:29.92:5:55:0.08 and further, the BHT was added to the nonaqueous solution at the rate of 0.8 ppm.

Example 10

A cylindrical nonaqueous electrolyte secondary battery was manufactured in the same manner as that of the Example 1 except that the composition of the nonaqueous electrolyte solution included LiPF$_6$, EC, PC, DMC, VC in the weight ratio 10:29.95:5:55:0.05 and further, the BHT was added to the nonaqueous solution at the rate of 0.5 ppm.

Example 11

A cylindrical nonaqueous electrolyte secondary battery was manufactured in the same manner as that of the Example 1 except that the composition of the nonaqueous electrolyte solution included LiPF$_6$, EC, PC, DMC in the weight ratio 10:30:5:55.

Example 12

A cylindrical nonaqueous electrolyte secondary battery was manufactured in the same manner as that of the Example 1 except that the composition of the nonaqueous electrolyte solution included LiPF$_6$, EC, PC, DMC, in the weight ratio 10:30:5:55 and further, the BHT was added to the nonaqueous solution at the rate of 100 ppm.

Example 13

A cylindrical nonaqueous electrolyte secondary battery was manufactured in the same manner as that of the Example 1 except that the composition of the nonaqueous electrolyte solution included LiPF$_6$, PC, DMC, VC in the weight ratio 10:5:55:30 and further, the BHT was added to the nonaqueous solution at the rate of 300 ppm.

Example 14

A cylindrical nonaqueous electrolyte secondary battery was manufactured in the same manner as that of the Example 1 except that the composition of the nonaqueous electrolyte solution included LiPF$_6$, EC, PC, DMC, VC in the weight ratio 10:29.99:5:55:0.01 and further, the BHT was added to the nonaqueous solution at the rate of 0.10 ppm.

Then, in the battery manufactured as described above, a cyclic test under an atmosphere of ambient temperature was evaluated in the following manner. Initially, after a constant-current and constant-voltage charging operation was carried out relative to each battery under the condition of upper limit voltage of 4.2 V and current of 1 A for 3 hours in a constant temperature bath at 23° C., a constant-current discharging operation of 0.4 A was carried out up to end voltage of 3.0 V. Under this condition, the charging and discharging operations were performed 500 times so that the rate of a 500th capacity relative to a second capacity was considered to be a capacity maintaining/retention ratio (%) of a 500th cycle.

Further, in the battery manufactured as described above, a cyclic test under an atmosphere of low temperature was evaluated in the following manner. Initially, after a constant-current and constant-voltage charging operation was carried out relative to each battery under the condition of upper limit voltage of 4.2 V and current of 1 A for 3 hours in a constant temperature bath at 10° C., a constant-current discharging operation of 0.4 A was carried out up to end voltage of 3.0 V. Under this condition, the charging and discharging operations were repeated 500 times so that the rate of a 500th capacity relative to a second capacity was considered to be a capacity maintaining/retention ratio (%) of a 500th cycle.

Further, a cyclic test under an atmosphere of high temperature was evaluated in the following manner. Initially, after a constant-current and constant-voltage charging operation was carried out relative to each battery under the condition of upper limit voltage of 4.2 V and current of 1 A for 3 hours in a constant temperature bath at 45° C., a constant-current discharging operation with current 0.4 A was carried out up to the end voltage of 3.0 V. Under this condition, the charging and discharging operations were repeated 500 times so that the rate of a 500th capacity relative to a second capacity was considered to be a capacity maintaining/retention ratio (%) of a 500th cycle.

Figure 2:
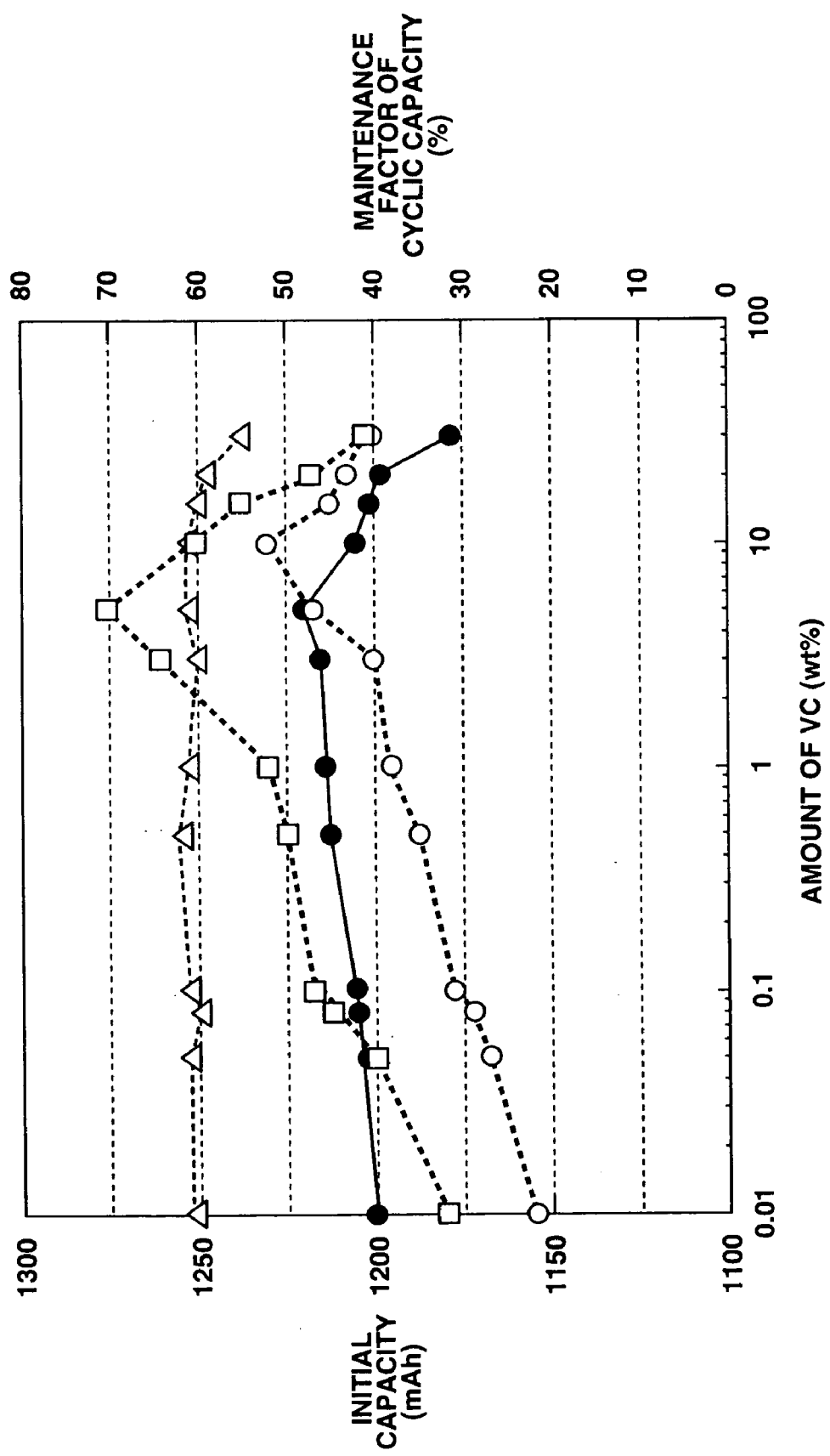
FIG. 2 is a graph showing the relation between the amount of addition of vinylene carbonate and a battery property in each of batteries manufactured in examples.

The evaluated results of the batteries of the Examples 1 to 14 are shown in Table 1. In the Table 1, the composition of the electrolyte solution is also shown. Further, the relation between the amount of addition of vinylene carbonate and the battery property is shown in FIG. 2. In FIG. 2, an initial capacity is indicated by a black circular mark, a cyclic characteristic at 10° C. is designated by a white circular mark, a cyclic characteristic at 23° C. is designated by a triangular mark and a cyclic characteristic at 45° C. is designated by a square mark, respectively.

TABLE 1

| | Amount of VC (wt %) | Amount of BHT (ppm) | Initial capacity (mAh) |
|---|---|---|---|
| Example 1 | 3 | 30 | 1215 |
| Example 2 | 5 | 50 | 1220 |
| Example 3 | 10 | 100 | 1205 |
| Example 4 | 15 | 150 | 1201 |
| Example 5 | 20 | 200 | 1198 |
| Example 6 | 1 | 10 | 1214 |
| Example 7 | 0.5 | 5 | 1213 |
| Example 8 | 0.1 | 1 | 1206 |
| Example 9 | 0.08 | 0.8 | 1205 |
| Example 10 | 0.05 | 0.5 | 1203 |
| Example 11 | 0 | 0 | 1200 |
| Example 12 | 0 | 100 | 1201 |
| Example 13 | 30 | 300 | 1178 |
| Example 14 | 0.01 | 0.1 | 1201 |

| | Cyclic capacity maintaining/ retention ratio at 10° C. | Cyclic capacity maintaining/ retention ratio at 23° C. | Cyclic capacity maintaining/ retention ratio at 45° C. |
|---|---|---|---|
| Example 1 | 40 | 60 | 64 |
| Example 2 | 47 | 61 | 70 |
| Example 3 | 52 | 61 | 60 |
| Example 4 | 45 | 60 | 55 |
| Example 5 | 43 | 59 | 47 |
| Example 6 | 38 | 61 | 52 |
| Example 7 | 35 | 62 | 50 |
| Example 8 | 31 | 61 | 47 |
| Example 9 | 29 | 60 | 45 |
| Example 10 | 27 | 61 | 40 |
| Example 11 | 18 | 60 | 20 |
| Example 12 | 20 | 62 | 60 |
| Example 13 | 40 | 55 | 41 |
| Example 14 | 22 | 61 | 32 |

As apparent from the Table 1, the cyclic capacity maintaining/retention ratio at 45° C. in the Examples 1 to 10 including VC in the electrolyte solution were higher than that of the Example 11 including no VC in the electrolyte solution. It is estimated from the result of the Example 12 that this phenomenon is caused more from the effect of BHT serving as the antioxidant than from the effect of VC.

Further, it was recognized from the Table 1 that the cyclic capacity maintaining/retention ratio at 10° C. in the Examples 1 to 10 including the VC in the electrolyte solution were higher than those of the Examples 11 and 12 including no VC in the electrolyte solution. Since the freezing point of EC is as high as 38° C., it is disadvantageous to use the EC in order to improve the low temperature property of the battery. Therefore, the vinylene carbonate (VC) having its freezing point at about 22° C. has been proposed as a solvent with a high dielectric constant in place of the EC. However, since the VC is liable to be decomposed under the environment of high temperature, the antioxidant is added to the electrolyte solution so that the decomposition of the VC or other solvents may be suppressed and the cyclic characteristic under high temperature may be improved.

In the Example 13, the initial capacity is lowered. It is estimated that an excess VC is added to lower the capacity. Further, in the Example 14, since the amount of VC is low, the cyclic capacity maintaining/retention ratio at 10° C. and 23° C. are not substantially different from those of the Example 11. In other words, for the amount of addition of VC, an optimum ratio is present. As apparent from FIG. 2, the amount of addition of VC is preferably located within a range of 0.05 wt % or more to 20 wt % or lower, and more preferably located within a range of 0.08 wt % or more to 15 wt % or lower.

[Examination of Anisole]

In Examples 15 to 28 described below, the amount of 4-fluoroanisole and the kinds of anisole were respectively changed to manufacture batteries and the characteristics thereof were evaluated.

Example 15

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:29:5:55:1.

Example 16

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:27:5:55:3.

Example 17

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:22:5:55:8.

Example 18

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:20:5:55:10.

Example 19

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:29.9:5:55:0.5.

Example 20

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:29.9:5:55:0.1.

Example 21

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:29.95:5:55:0.05.

Example 22

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:29.98:5:55:0.02.

Example 23

A cylindrical nonaqueous electrolyte secondary battery was manufactured in the same manner as that of the Example 1 except that the composition of the nonaqueous electrolyte solution included $LiPF_6$, EC, PC, DMC, 4-fluoroanisole in the weight ratio 10:29.99:5:55:0.01.

Example 24

A cylindrical nonaqueous electrolyte secondary battery was manufactured in the same manner as that of the Example 1 except that the composition of the nonaqueous electrolyte solution included $LiPF_6$, EC, PC, DMC 2,4-difluoroanisole in the weight ratio 10:29:5:55:1.

Example 25

A cylindrical nonaqueous electrolyte secondary battery was manufactured in the same manner as that of the Example 1 except that the composition of the nonaqueous electrolyte solution included $LiPF_6$, EC, PC, DMC, 2,3,5,6-tetrafluoro-4-methylanisole in the weight ratio 10:29:5:55:1.

Example 26

A cylindrical nonaqueous electrolyte secondary battery was manufactured in the same manner as that of the Example 1 except that the composition of the nonaqueous electrolyte solution included $LiPF_6$, EC, PC, DMC, 4-bromoanisole in the weight ratio 10:29:5:55:1.

Example 27

A cylindrical nonaqueous electrolyte secondary battery was manufactured in the same manner as that of the Example 1 except that the composition of the nonaqueous electrolyte solution included LiPF$_6$, EC, PC, DMC, 4-fluoroanisole in the weight ratio

Example 28

A cylindrical nonaqueous electrolyte secondary battery was manufactured in the same manner as that of a Example 1 except that the composition of the nonaqueous electrolyte solution included LiPF$_6$, EC, PC, DMC, 4-fluoroanisole in the weight ratio 10:29.995:5:55:0.005.

Figure 3:
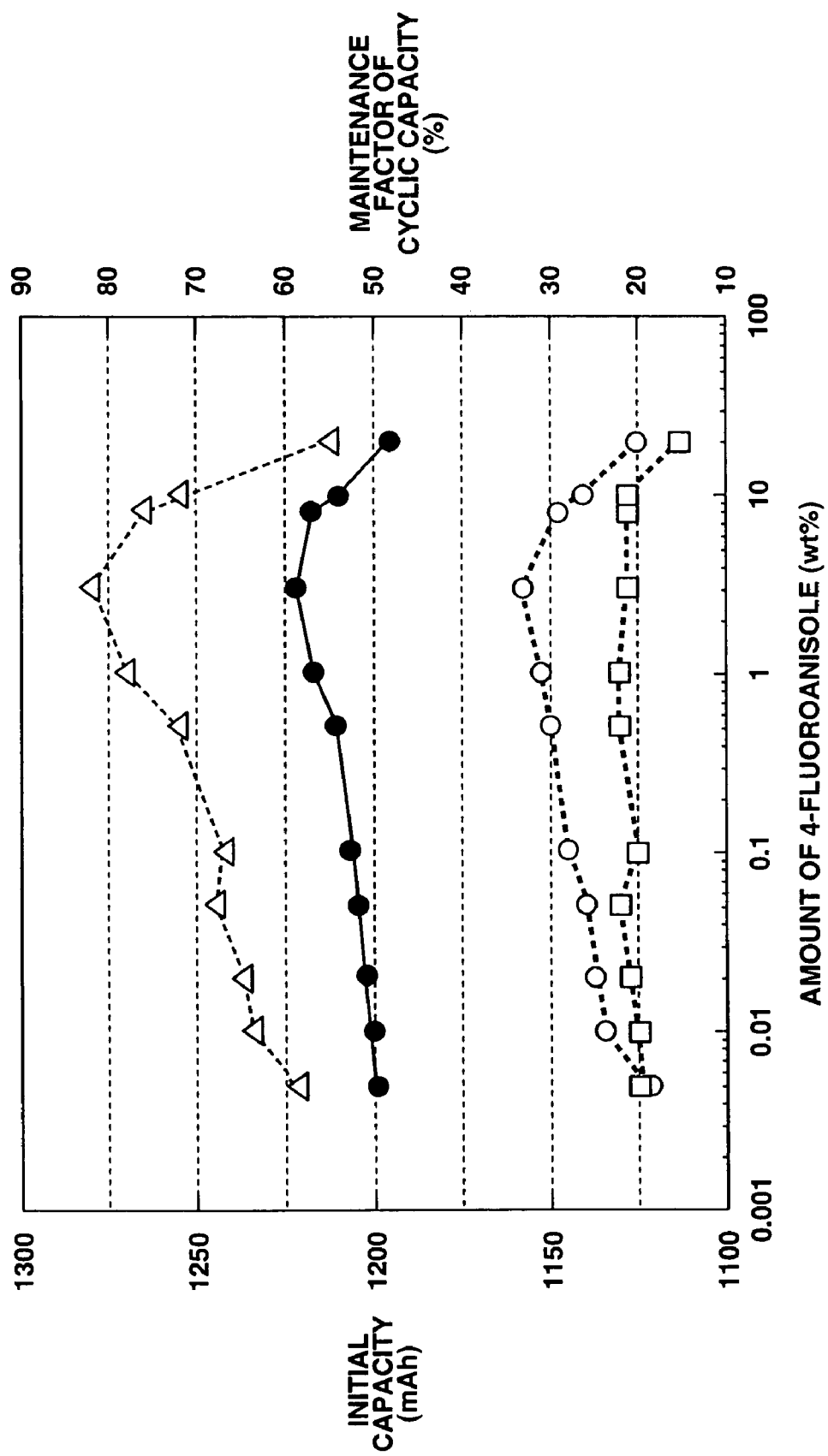
FIG. 3 is a graph showing the relation between the amount of addition of 4-fluoroanisole and a battery property in each of batteries manufactured in examples.

The evaluated results of the batteries of these Examples 15 to 28 are shown in Table 2. In the Table 2, for comparison, the results of the above described Example 11 are also shown. Further, the relation between the amount of addition of the 4-fluoroanisole and the battery property is shown in FIG. 3. Referring to FIG. 3, the initial capacity is designated by a black circular mark, a cyclic characteristic at 10° C. is designated by a white circular mark, a cyclic characteristic at 23° C. is indicated by a triangular mark and a cyclic characteristic at 45° C. is designated by a square mark.

TABLE 2

| | Name of methoxybenzene compound | Amount of methoxybenzene (wt %) | Initial capacity (mAh) |
|---|---|---|---|
| Example 15 | 4-fluoroanisole | 1 | 1217 |
| Example 16 | 4-fluoroanisole | 3 | 1222 |
| Example 17 | 4-fluoroanisole | 8 | 1218 |
| Example 18 | 4-fluoroanisole | 10 | 1210 |
| Example 19 | 4-fluoroanisole | 0.5 | 1211 |
| Example 20 | 4-fluoroanisole | 0.1 | 1207 |
| Example 21 | 4-fluoroanisole | 0.05 | 1205 |
| Example 22 | 4-fluoroanisole | 0.02 | 1203 |
| Example 23 | 4-fluoroanisole | 0.01 | 1201 |
| Example 24 | 2,4-difluoroanisole | 1 | 1230 |
| Example 25 | 2, 3, 5, 6-tetrafluoro-4-methylanisole | 1 | 1231 |
| Example 26 | 4-bromoanisole | 1 | 1233 |
| Example 27 | 4-fluoroanisole | 20 | 1195 |
| Example 28 | 4-fluoroanisole | 0.05 | 1200 |
| Example 11 | — | 0 | 1200 |

| | Cyclic capacity maintaining/retention ratio at 10° C. | Cyclic capacity maintaining/retention ratio at 23° C. | Cyclic capacity maintaining/retention ratio at 45° C. |
|---|---|---|---|
| Example 15 | 31 | 78 | 22 |
| Example 16 | 33 | 82 | 21 |
| Example 17 | 29 | 76 | 21 |
| Example 18 | 26 | 72 | 21 |
| Example 19 | 30 | 72 | 22 |
| Example 20 | 28 | 68 | 22 |
| Example 21 | 26 | 67 | 20 |
| Example 22 | 25 | 65 | 21 |
| Example 23 | 24 | 64 | 20 |
| Example 24 | 52 | 80 | 21 |
| Example 25 | 53 | 81 | 23 |
| Example 26 | 54 | 77 | 21 |
| Example 27 | 20 | 55 | 15 |
| Example 28 | 19 | 59 | 20 |
| Example 11 | 18 | 60 | 20 |

As apparent from the Table 2, the capacity maintaining/retention ratio at 23° C. in the Examples 15 to 23 including the 4-fluoroanisole in the electrolyte solution were higher than that of the Example 11 including no methoxybenzene compound. Further, from the Examples 24 to 26 including methoxybenzene compounds other than 4-fluoroanisole, good results could be similarly obtained. Since the battery to which the methoxybenzene compound is added effectively suppresses the deterioration of capacity generated when the battery is kept in a charged state at room temperature, this effect may possibly contribute to good results in the cyclic characteristic at 23° C.

In the Example 27, the cyclic characteristic at room temperature is deteriorated. It is estimated that an excess 4-fluoroanisole is added to the electrolyte solution to lower the capacity. Further, in the Example 28, since a small amount of 4-fluoroanisole is added to the electrolyte solution, the cyclic characteristics at 10° C., 23° C. and 45° C. are substantially the same as those of the Example 11. In other words, for the amount of addition of methoxybenzene compound, an optimum ratio exists. As apparent from FIG. 3, the amount of addition of methoxybenzene compound is preferably located within a range of 0.01 wt % or more to 10 wt % or lower, and more preferably located within a range of 0.02 wt % or more to 10 wt % or lower.

[Examination of Combination of Vinylene Carbonate, Antioxidant and Methoxybenzene Compound]

In Examples 29 to 33, the combinations of vinylene carbonate, antioxidants and methoxybenzene compounds were respectively changed to manufacture batteries and the characteristics thereof were evaluated.

Example 29

A cylindrical nonaqueous electrolyte secondary battery was manufactured in the same manner as that of the Example 1 except that the composition of the nonaqueous electrolyte solution included LiPF$_6$, EC, PC, DMC, VC, 4-fluoroanisole in the weight ratio 10:26:5:55:3:1 and further, the BHT was added to the nonaqueous solution at the rate of 30 ppm.

Example 30

A cylindrical nonaqueous electrolyte secondary battery was manufactured in the same manner as that of the Example 1 except that the composition of the nonaqueous electrolyte solution included LiPF$_6$, EC, PC, DMC, 4-fluoroanisole in the weight ratio 10:29:5:55:1 and further, the BHT was added to the nonaqueous solution at the rate of 200 ppm.

Example 31

A cylindrical nonaqueous electrolyte secondary battery was manufactured in the same manner as that of the Example 1 except that the composition of the nonaqueous electrolyte solution included LiPF$_6$, EC, PC, DMC, in the weight ratio 10:30:5:55 and further, the BHT was added to the nonaqueous solution at the rate of 200 ppm.

Example 32

A cylindrical nonaqueous electrolyte secondary battery was manufactured in the same manner as that of the Example 1 except that the composition of the nonaqueous electrolyte solution included LiPF$_6$, EC, PC, DMC, VC in the weight ratio 10:27:5:55:3.

Example 33

A cylindrical nonaqueous electrolyte secondary battery was manufactured in the same manner as that of the Example 1 except that the composition of the nonaqueous electrolyte solution included $LiPF_6$, EC, PC, DMC, VC, 4-fluoroanisole in the weight ratio 10:26:5:55:3:1.

The results of evaluations of these batteries in these Examples 29 to 33 are shown in Table 3. In the Table 3, the results of the above described Example 11 are also shown for comparison.

TABLE 3

| | Amount of VC (wt %) | Amount of BHT (ppm) | Name of methoxybenzene compound | Amount of methoxybenzene (wt %) |
|---|---|---|---|---|
| Example 29 | 3 | 30 | 4-fluoroanisole | 1 |
| Example 30 | 0 | 200 | 4-fluoroanisole | 1 |
| Example 31 | 0 | 200 | — | 0 |
| Example 32 | 3 | 0 | — | 0 |
| Example 33 | 3 | 0 | 4-fluoroanisole | 1 |
| Example 11 | 0 | 0 | — | 0 |

| | Initial capacity (mAh) | Cyclic capacity maintaining/ retention ratio at 10° C. | Cyclic capacity maintaining retention ratio at 23° C. | Cyclic capacity maintaining/ retention ratio at 45° C. |
|---|---|---|---|---|
| Example 29 | 1231 | 51 | 80 | 65 |
| Example 30 | 1229 | 30 | 79 | 56 |
| Example 31 | 1205 | 29 | 62 | 51 |
| Example 32 | 1202 | 40 | 60 | 21 |
| Example 33 | 1225 | 42 | 77 | 22 |
| Example 11 | 1200 | 18 | 60 | 20 |

As understood from the Table 3, the VC good in its cyclic characteristics at 10° C. and 45° C., the electrolyte solution to which the antioxidant was added and the 4-fluoroanisole good in its cyclic characteristic at 45° C. were mixed together, so that excellent cyclic characteristics could be obtained in all the ranges. Further, a good cyclic characteristic could be obtained even by one or two kinds of these materials not in all the ranges but in a part of the ranges.

[Examination of Cathode Active Material]

In Examples 34 to 45 described below, the rates of lithium-manganese composite oxide, lithium-cobalt composite compound and lithium-nickel composite compound which form a cathode active material were respectively changed to manufacture batteries and the characteristics thereof were examined.

Example 34

A cylindrical nonaqueous electrolyte secondary battery was manufactured in the same manner as that of the Example 1 except that the composition of the cathode active material included $LiMn_{1.8}Cr_{0.2}O_4$ and $LiNi_{0.8}Co_{0.2}O_2$ in the weight ratio 80:20, the composition of the nonaqueous electrolyte solution included $LiPF_6$, EC, PC, DMC, VC, and 4-fluoroanisole in the weight ratio 10:26:5:55:3:1 and further, the BHT was added to the nonaqueous electrolyte solution at the rate of 30 ppm.

Example 35

A cylindrical nonaqueous electrolyte secondary battery was manufactured in the same manner as that of the Example 1 except that the composition of the cathode active material included $LiMn_{1.8}Cr_{0.2}O_4$ and $LiCoO_2$ in the weight ratio 80:20, the composition of the nonaqueous electrolyte solution included $LiPF_6$, EC, PC, DMC, VC, and 4-fluoroanisole in the weight ratio 10:26:5:55:3:1 and further, the BHT was added to the nonaqueous electrolyte solution at the rate of 30 ppm.

Example 36

A cylindrical nonaqueous electrolyte secondary battery was manufactured in the same manner as that of the Example 1 except that the composition of the cathode active material included $LiMn_{1.8}Cr_{0.2}O_4$, $LiNi_{0.8}Co_{0.2}O_2$ and $LiCoO_2$ in the weight ratio 80:10:10, the composition of the nonaqueous electrolyte solution included $LiPF_6$, EC, PC, DMC, VC, and 4-fluoroanisole in the weight ratio 10:26:5:55:3:1 and further, the BHT was added to the nonaqueous electrolyte solution at the rate of 30 ppm.

Example 37

A cylindrical nonaqueous electrolyte secondary battery was manufactured in the same manner as that of the Example 1 except that the composition of the cathode active material included $LiMn_{1.8}Cr_{0.2}O_4$ and $LiNi_{0.8}Co_{0.2}O_2$ and $LiCoO_2$ in the weight ratio 80:10:10, the composition of the nonaqueous electrolyte solution included $LiPF_6$, EC, PC, DMC, VC in the weight ratio 10:27:5:55:3 and further, the BHT was added to the nonaqueous electrolyte solution at the rate of 10 ppm.

Example 38

A cylindrical nonaqueous electrolyte secondary battery was manufactured in the same manner as that of the Example 1 except that the composition of the cathode active material included $LiMn_{1.8}Cr_{0.2}O_4$, $LiNi_{0.8}Co_{0.2}O_2$ and $LiCoO_2$ in the weight ratio 80:10:10, the composition of the nonaqueous electrolyte solution included $LiPF_6$, EC, PC, DMC, 4-fluoroanisole in the weight ratio 10:29:5:55:1.

Example 39

A cylindrical nonaqueous electrolyte secondary battery was manufactured in the same manner as that of the Example 1 except that the composition of the cathode active material included $LiMn_{1.8}Cr_{0.2}O_4$, $LiNi_{0.8}Co_{0.2}O_2$ and $LiCoO_2$ in the weight ratio 80:10:10, the composition of the nonaqueous electrolyte solution included $LiPF_6$, EC, PC, DMC, and 4-fluoroanisole in the weight ratio 10:29:5:55:1 and further, the BHT was added to the nonaqueous electrolyte solution at the rate of 200 ppm.

Example 40

A cylindrical nonaqueous electrolyte secondary battery was manufactured in the same manner as that of the Example 1 except that the composition of the cathode active material included $LiMn_{1.8}Cr_{0.2}O_4$, $LiNi_{0.8}Co_{0.2}O_2$ and $LiCoO_2$ in the weight ratio 80:10:10, the composition of the nonaqueous electrolyte solution included $LiPF_6$, EC, PC, DMC, in the weight ratio 10:30:5:55 and further, the BHT was added to the nonaqueous electrolyte solution at the rate of 200 ppm.

Example 41

A cylindrical nonaqueous electrolyte secondary battery was manufactured in the same manner as that of the Example 1 except that the composition of the cathode active material included $LiMn_{1.8}Cr_{0.2}O_4$, $LiNi_{0.8}Co_{0.2}O_2$ and $LiCoO_2$ in the ratio 80:10:10, the composition of the nonaqueous electrolyte solution included $LiPF_6$, EC, PC, DMC, VC, in the weight ratio 10:27:5:55:3.

Example 42

A cylindrical nonaqueous electrolyte secondary battery was manufactured in the same manner as that of the Example 1 except that the composition of the cathode active material included $LiMn_{1.8}Cr_{0.2}O_4$ and $LiNi_{0.8}Co_{0.2}O_2$ and $LiCoO_2$ in the weight ratio 80:10:10, the composition of the nonaqueous electrolyte solution included $LiPF_6$, EC, PC, DMC, VC, 4-fluoroanisole in the weight ratio 10:26:5:55:3:1.

Example 43

A cylindrical nonaqueous electrolyte secondary battery was manufactured in the same manner as that of the Example 1 except that the composition of the cathode active material included $LiMn_{1.8}Cr_{0.2}O_4$, $LiNi_{0.8}Co_{0.2}O_2$ in the weight ratio 80:20, and the composition of the nonaqueous electrolyte solution included $LiPF_6$, EC, PC, DMC, in the weight ratio 10:30:5:55.

Example 44

A cylindrical nonaqueous electrolyte secondary battery was manufactured in the same manner as that of the Example 1 except that the composition of the cathode active material included $LiMn_{1.8}Cr_{0.2}O_4$, and $LiCoO_2$ in the weight ratio 80:20 and the composition of the nonaqueous electrolyte solution included $LiPF_6$, EC, PC, DMC in the weight ratio 10:30:5:55.

Example 45

A cylindrical nonaqueous electrolyte secondary battery was manufactured in the same manner as that of the Example 1 except that the composition of the cathode active material included $LiMn_{1.8}Cr_{0.2}O_4$, $LiNi_{0.8}Co_{0.2}O_2$ and $LiCoO_2$ in the weight ratio 80:10:10 and the composition of the nonaqueous electrolyte solution included $LiPF_6$, EC, PC, DMC, in the weight ratio 10:30:5:55.

The results of evaluations of the batteries in these Examples 34 to 45 are shown in Table 4.

TABLE 4

| | Amount of VC (wt %) | Amount of BHT (ppm) | Amount of methoxy-benzene (wt %) | Name of methoxy-benzene compound |
|---|---|---|---|---|
| Example 34 | 3 | 30 | 1 | 4-fluoroanisole |
| Example 35 | 3 | 30 | 1 | 4-fluoroanisole |
| Example 36 | 3 | 30 | 1 | 4-fluoroanisole |
| Example 37 | 3 | 10 | 0 | — |
| Example 38 | 0 | 0 | 1 | 4-fluoroanisole |
| Example 39 | 0 | 200 | 1 | 4-fluoroanisole |
| Example 40 | 0 | 200 | 0 | — |
| Example 41 | 3 | 0 | 0 | — |
| Example 42 | 3 | 0 | 1 | 4-fluoroanisole |
| Example 43 | 0 | 0 | 0 | — |
| Example 44 | 0 | 0 | 0 | — |
| Example 45 | 0 | 0 | 0 | — |

| | Cathode active material | Initial capacity (mAh) |
|---|---|---|
| Example 34 | $LiMn_{1.8}Cr_{0.2}O_4 + LiNi_{0.8}Co_{0.2}O_2$ | 1400 |
| Example 35 | $LiMn_{1.8}Cr_{0.2}O_4 + LiCoO_2$ | 1320 |
| Example 36 | $Lin_{1.8}Cr_{0.2}O_4 + LiNi_{0.8}Co_{0.2}O_2 + LiCoO_2$ | 1362 |
| Example 37 | $Lin_{1.8}Cr_{0.2}O_4 + LiNi_{0.8}Co_{0.2}O_2 + LiCoO_2$ | 1350 |
| Example 38 | $Lin_{1.8}Cr_{0.2}O_4 + LiNi_{0.8}Co_{0.2}O_2 + LiCoO_2$ | 1363 |
| Example 39 | $Lin_{1.8}Cr_{0.2}O_4 + LiNi_{0.8}Co_{0.2}O_2 + LiCoO_2$ | 1363 |
| Example 40 | $Lin_{1.8}Cr_{0.2}O_4 + LiNi_{0.8}Co_{0.2}O_2 + LiCoO_2$ | 1350 |
| Example 41 | $Lin_{1.8}Cr_{0.2}O_4 + LiNi_{0.8}Co_{0.2}O_2 + LiCoO_2$ | 1352 |
| Example 42 | $Lin_{1.8}Cr_{0.2}O_4 + LiNi_{0.8}Co_{0.2}O_2 + LiCoO_2$ | 1364 |
| Example 43 | $LiMn_{1.8}Cr_{0.2}O_4 + LiNi_{0.8}Co_{0.2}O_2$ | 1380 |
| Example 44 | $LiMn_{1.8}Cr_{0.2}O_4 + LiCoO_2$ | 1300 |
| Example 45 | $Lin_{1.8}Cr_{0.2}O_4 + LiNi_{0.8}Co_{0.2}O_2 + LiCoO_2$ | 1340 |

| | Cyclic capacity maintaining/ retention ratio at 10° C. | Cyclic capacity maintaining/ retention ratio at 23° C. | Cyclic capacity maintaining/ retention ratio at 45° C. |
|---|---|---|---|
| Example 34 | 55 | 84 | 75 |
| Example 35 | 56 | 85 | 73 |
| Example 36 | 54 | 85 | 73 |
| Example 37 | 55 | 63 | 71 |
| Example 38 | 23 | 84 | 29 |
| Example 39 | 23 | 85 | 70 |
| Example 40 | 22 | 62 | 70 |
| Example 41 | 55 | 61 | 30 |
| Example 42 | 54 | 86 | 31 |
| Example 43 | 23 | 62 | 30 |
| Example 44 | 22 | 63 | 29 |
| Example 45 | 22 | 62 | 29 |

As understood from Table 4, in the battery using the electrolyte solution containing the mixture of vinylene carbonate, antioxidant and methoxybenzene compound, even when a cathode composed of the mixture of lithium-manganese composite oxide and lithium-cobalt oxide or lithium-nickel composite oxide was employed, it achieved an effect the same as that of a cathode composed only of lithium-manganese composite oxide. Further, it was found that a good cyclic characteristic could be obtained not in all the area but in part therefor even when the cathode made of one or two kinds of the above described materials was used.

It is estimated that the above effects can be achieved, because the vinylene carbonate is decomposed in accordance with an initial charging operation and the surface of the anode is covered with the decomposed product to prevent the decomposition of the electrolyte of the electrolyte solution. Further, it is estimated that both the vinylene carbonate and 2,4-difluoroanisole are decomposed in accordance with the initial charging and the surface of the anode is covered with the decomposed products to prevent the decomposition of the electrolyte solution under the high temperature. Still further, it is estimated that the surface coat of both the vinylene carbonate and the 2,4-difluoroanisole prevents more the decomposition of the electrolyte solution under the high temperature than that made only of the vinylene carbonate.

Therefore, it is understood that the generation of gas due to the decomposition of the electrolyte solution and the expansion of a battery can be more effectively suppressed by adding both the vinylene carbonate and 2,4-difluoroanisole to the electrolyte solution.

As described above, according to the present invention, at least one or more kinds of materials of the vinylene carbonate effective for improving the cyclic characteristic at low temperature, the methoxybenzene compound effective for improving the cyclic characteristic at ambient temperature and the antioxidant effective for improving the cyclic characteristic at high temperature are combined together and the combination therefor is added to nonaqueous electrolyte solution, and accordingly, the nonaqueous electrolyte battery having the good cyclic characteristics within a wider range of temperature can be realized.

As mentioned above, according to the present invention, the unsaturated cyclic carbonate and/or the halogenated methoxybenzene compound, particularly, both the vinylene carbonate and 2,4-difluoroanisole are added to the nonaqueous electrolyte solution. Therefore, even when the battery is exposed to high temperature, the generation of gas due to the decomposition of the electrolyte solution can be prevented and the expansion of the battery can be suppressed. Thus, according to the present invention, the nonaqueous electrolyte battery with high reliability can be realized.

What is claimed is:

1. A nonaqueous electrolyte secondary battery comprises
a cathode having a cathode active material capable of being electrochemically doped/dedoped with lithium;
an anode having an anode active material capable of being electrochemically doped/dedoped with lithium and
a nonaqueous electrolyte interposed between the cathode and the anode,
wherein said cathode active material is a lithium composite oxide expressed by a general formula $Li_xMO_2$ (here, x is not smaller than 0.9 and M indicates at least one or more elements selected from between Fe, Co, Mn, Cu, Zn, Al, Sn, B, Ga, Cr, V, Ti, Mg, Ca and Sr) and
said nonaqueous electrolyte includes a vinylene carbonate and at least one kind of material selected from between quinones, aromatic amines, vitamin E, vitamin C, sesamoles and quercetins.

2. A nonaqueous electrolyte secondary battery according to claim 1, wherein said nonaqueous electrolyte includes 0.05 wt % or more to 20 wt % or lower of the vinylene carbonate.

3. A nonaqueous electrolyte secondary battery according to claim 1, wherein said electrolyte further includes a methoxybenzene compound.

4. A nonaqueous electrolyte secondary battery according to claim 3, wherein said non-aqueous electrolyte includes 0.01 wt % or more to 10 wt % or lower of the methoxybenzene compound.

5. A nonaqueous electrolyte secondary battery according to claim 3, wherein said methoxybenzene compounds employ one kind of material selected from between 4-fluoroanisole, 2,4-difluoroanisole, 2-bromoanisole, 2,3,5,6-tetrafluoro-4-methylanisole.

6. A nonaqueous electrolyte secondary battery according to claim 1, wherein said cathode has a cathode active material layer formed by applying a cathode compound mixture including a cathode active material and a binding material to both the surfaces of a metal foil serving as a cathode current collector, said anode has an anode active material layer formed by uniformly applying an anode compound mixture including an anode active material and a binding agent to a metal foil serving as an anode current collector and drying the anode compound mixture and said cathode and the anode are laminated through microporous film separators and the obtained laminated body is coiled spirally a plurality of times to obtain a coiled electrode body.

7. A nonaqueous electrolyte secondary battery according to claim 1, wherein said nonaqueous electrolyte secondary battery is a solid electrolyte battery using, as said electrolyte, a solid polymer electrolyte including one or more of substances or mixture of polymer compounds or a gel electrolyte battery using a gel solid electrolyte including a swelling solvent.

8. A nonaqueous electrolyte secondary battery according to claim 3, wherein said methoxybenzene compounds employ 4-fluoroanisole.

9. A nonaqueous electrolyte secondary battery comprises
a cathode having a cathode active material capable of being electrochemically doped/dedoped with lithium;
an anode having an anode active material capable of being electrochemically doped/dedoped with lithium and
a nonaqueous electrolyte interposed between the cathode and the anode,
wherein said cathode active material includes a lithium-manganese composite oxide expressed by a general formula $Li_xMn_{2-y}M'_yO_4$ (here, x satisfies the relation expressed by $x \geq 0.9$, y satisfies the relation expressed by $0.5 \geq y \geq 0.01$. M' indicates at least one or more elements selected from between Fe, Co, Ni, Cu, Zn, Al, Sn, Cr, V, Ti, Mg, Ca and Sr) and said nonaqueous electrolyte includes a vinylene carbonate and at least one kind of material selected from between quinones, aromatic amines, vitamin E, vitamin C, sesamoles and quercetins.

10. A nonaqueous electrolyte secondary battery according to claim 9, wherein said nonaqueous electrolyte includes 0.05 wt % or more to 20 wt % or lower of the vinylene carbonate.

11. A nonaqueous electrolyte secondary battery according to claim 9, wherein said electrolyte further includes a methoxybenzene compound.

12. A nonaqueous electrolyte secondary battery according to claim 11, wherein said nonaqueous electrolyte includes 0.01 wt % or more to 10 wt % or lower of the methoxybenzene compounds.

13. A nonaqueous electrolyte secondary battery according to claim 11, wherein said methoxybenzene compounds employ one kind of material selected from between 4-fluoroanisole, 2,4-difluoroanisole, 2-bromoanisole, 2,3,5,6-tetrafluoro-4-methylanisole.

14. A nonaqueous electrolyte secondary battery according to claim 11, wherein said methoxybenzene compounds employ 4-fluoroanisole.

15. A nonaqueous electrolyte secondary battery according to claim 9, wherein said cathode has a cathode active material layer formed by applying a cathode compound mixture including a cathode active material and a binding material to both the surfaces of a metal foil serving as a cathode current collector, said anode has an anode active material layer formed by uniformly applying an anode compound mixture including an anode active material and a binding agent to a metal foil serving as an anode current collector and drying the anode compound mixture and said cathode and the anode are laminated through microporous film separators and the obtained laminated body is coiled spirally a plurality of times to obtain a coiled electrode body.

16. A nonaqueous electrolyte secondary battery according to claim 9, wherein said nonaqueous electrolyte secondary battery is a solid electrolyte battery using, as said electrolyte, a solid polymer electrolyte including one or more of substances or mixture of polymer compounds or a gel electrolyte battery using a gel solid electrolyte including a swelling solvent.

17. A nonaqueous electrolyte secondary battery comprises
a cathode having a cathode active material capable of being electrochemically doped/dedoped with lithium;
an anode having an anode active material capable of being electrochemically doped/dedoped with lithium and
a nonaqueous electrolyte interposed between the cathode and the anode,
wherein said cathode active material includes a lithium-manganese composite oxide expressed by a general formula $Li_xM_{2-y}M'_yO_4$ (here, x satisfies the relation expressed by $x \geq 0.9$ and y satisfies the relation expressed by $0.5 \geq y \geq 0.01$. M' indicates at least one or more elements selected from between Fe, Go, Ni, Cu, Zn, Al, Sn, Cr, V, Ti, Mg, Ca and Sr) and a lithium composite oxide expressed by a general formula $LiM''_zO_2$ (here, z satisfies the relation expressed by $1 \geq z \geq 0.5$ and M'' indicates at least one or more elements selected from between Fe, Co, Mn, Cu, Zn, Al, Sn, B, Ga, Cr, V, Ti, Mg, Ca and Sr) and said nonaqueous electrolyte includes a vinylene carbonate and at least one kind of material selected from between quinones, aromatic amines, vitamin E, vitamin C, sesamoles and quercetins.

18. A nonaqueous electrolyte secondary battery according to claim 17, wherein said nonaqueous electrolyte includes 0.05 wt % or more to 20 wt % or lower of the vinylene carbonate.

19. A nonaqueous electrolyte secondary battery according to claim 17, wherein said electrolyte further includes a methoxybenzene compound.

20. A nonaqueous electrolyte secondary battery according to claim 19, wherein said nonaqueous electrolyte includes 0.01 wt % or more to 10 wt % or lower of the methoxybenzene compounds.

21. A nonaqueous electrolyte secondary battery according to claim 19, wherein said methoxybenzene compounds employ one kind of material selected from between 4-fluoroanisole, 2,4-difluoroanisole, 2-bromoanisole, 2,3,5,6-tetrafluoro-4-methylanisole.

22. A nonaqueous electrolyte secondary battery according to claim 17, wherein said cathode has a cathode active material layer formed by applying a cathode compound mixture including a cathode active material and a binding material to both the surfaces of a metal foil serving as a cathode current collector, said anode has an anode active material layer formed by uniformly applying an anode compound mixture including an anode active material and a binding agent to a metal foil serving as an anode current collector and drying the anode compound mixture and said cathode and the anode are laminated through microporous film separators and the obtained laminated body is coiled spirally a plurality of times to obtain a coiled electrode body.

23. A nonaqueous electrolyte secondary battery according to claim 17, wherein said nonaqueous electrolyte secondary battery is a solid electrolyte battery using, as said electrolyte, a solid polymer electrolyte including one or more of substances or mixture of polymer compounds or a gel electrolyte battery using a gel solid electrolyte including a swelling solvent.

24. A nonaqueous electrolyte secondary battery according to claim 19, wherein said methoxybenzene compounds employ 4-fluoroanisole.

\* \* \* \* \*